(12) United States Patent
O'Toole et al.

(10) Patent No.: US 7,185,077 B1
(45) Date of Patent: Feb. 27, 2007

(54) METHODS AND APPARATUS FOR MANAGING THE ARRANGEMENT OF NODES IN A NETWORK

(75) Inventors: James O'Toole, Somerville, MA (US); John H. Jannotti, Cambridge, MA (US)

(73) Assignee: Cisco Technology, Inc., San Jose, CA (US)

( * ) Notice: Subject to any disclaimer, the term of this patent is extended or adjusted under 35 U.S.C. 154(b) by 999 days.

(21) Appl. No.: 09/864,487

(22) Filed: May 24, 2001

Related U.S. Application Data

(63) Continuation-in-part of application No. 09/752,842, filed on Dec. 29, 2000.

(60) Provisional application No. 60/177,985, filed on Jan. 25, 2000.

(51) Int. Cl.
*G06F 15/16* (2006.01)

(52) U.S. Cl. ............... 709/223; 709/224; 709/238; 370/254

(58) Field of Classification Search ........ 709/201–203, 709/231–235, 238–239, 223–224, 217–219; 707/2, 4–5, 102, 104; 370/254–256, 217, 370/220
See application file for complete search history.

(56) References Cited

U.S. PATENT DOCUMENTS 5,471,580 A * 11/1995 Fujiwara et al. ............ 709/249
5,941,955 A    8/1999 Wilby et al. ................ 709/242
6,052,718 A *  4/2000 Gifford ....................... 709/219
6,061,722 A *  5/2000 Lipa et al. .................. 709/224

* cited by examiner

*Primary Examiner*—Andrew Caldwell
*Assistant Examiner*—Benjamin Ailes
(74) *Attorney, Agent, or Firm*—BainwoodHuang

(57) ABSTRACT

The invention is directed to techniques for managing a network of nodes by automatically configuring the arrangement of nodes in the network. A network manager in a node selects a group of nodes and compares network metrics for each node in the group, such as a bottleneck bandwidth measurement from each node to a root node of the network. The network manager selects a target node using the network metrics. Optionally, the network manager can select a new group of nodes using the target node, compare network metrics for the new group, and optionally select a new target node. If the node is a newly connecting node to the network, the network manager can repeat this process of selecting new groups until establishing a relationship with a target node that is not a root node (e.g., with performance that is the same, or about the same, as the root node), because the goal is not to overload the root node with too many relationships. If the node is a node with an established relationship to the network that is trying to reconnect to a new target node, the network manager can repeat the process of selecting new groups until establishing a relationship with a new target node that provides improved performance than the previous target node, but is, preferably, not the root node.

16 Claims, 15 Drawing Sheets

METHODS AND APPARATUS FOR MANAGING THE ARRANGEMENT OF NODES IN A NETWORK

CROSS REFERENCE TO AND CLAIM TO BENEFIT OF RELATED APPLICATIONS

This application is a continuation-in-part of, and claims the benefit of the filing date of, U.S. patent application Ser. No. 09/752,842 filed Dec. 29, 2000, entitled, "Methods and Apparatus for Maintaining a Map of Node Relationships for a Network," the disclosure of which is incorporated in its entirety herein by reference, which claims the benefit of the filing date of U.S. Provisional Patent Application No. 60/177,985, filed Jan. 25, 2000, entitled "Fast Changing Network Status and Load Monitoring and Feedback," the disclosure of which is hereby incorporated by reference in its entirety.

This application is related to U.S. Pat. No. 6,052,718, issued Apr. 18, 2000, entitled "Replica Routing," the disclosure of which is incorporated in its entirety herein by reference.

BACKGROUND OF THE INVENTION

Historically, computers communicated over dedicated communication lines or through a specific connection such as a modem connection from one computer to another. Computers have also been connected in networks that allow communication among a number of computers. Typically, human installers set up such a network in a static configuration. To change the arrangement of computers in the network, a network administrator can rearrange the cables connecting the computers, such as by rearranging the connections of network cables that plug in to a common connection box (e.g., switch, hub, or router) for that network. The network administrator can measure the usage of the network (e.g., with a monitoring device) and physically rearrange the connections in the network to a new static configuration to relieve an area of high usage or congestion. Also, when adding a new computer to the network, the network administrator can measure the usage of the network avoid an area of high usage or congestion.

In a modem network, such as the Internet based on the TCP (Transmission Control Protocol) and the IP (the Internet Protocol), a computer can establish a connection (e.g., TCP/IP connection) to another computer in the network for a period of time, and then establish another connection to an additional computer in the network for a period of time. Such connections are typically for specific purposes for transient periods of time.

Such a connection can form a pathway from one computer to another over a network (e.g., the Internet). The pathway may be based on virtual connections, as well as on the physical connections between computers. In a network like the Internet, a virtual connection between computers may be viewed as one data communications connection or pathway based on one or more underlying physical connections between the computers. For example, one client computer can make a virtual connection to a server computer by referencing an HTTP (Hypertext Transfer Protocol) hyperlink in a web page to the server. The client and server computers can be located in the same building. Alternatively, the two computers may be located in different cities. In this case, the physical connections between the two computers may pass through many intermediate computers (e.g., many nodes or hops on the Internet) while the virtual connection is viewed as one pathway (e.g., between a web site served by the server and the client computer). A pathway can change based on the activities of the client and server computers. For example, a user of web browser on a client can change the pathways to different servers by using the browser to link to different web sites.

SUMMARY OF THE INVENTION

In conventional approaches to managing the arrangement of nodes in a network, such as described above, a network may change due to specific interventions. For example, human intervention is required to change the connections of nodes to the network, such as when changing the physical connection of computers to a local area network (LAN) to provide for better performance in the LAN. In another example, changes to the arrangement of nodes in a network occur for specific purposes not related to performance (e.g., when a user attaches to a specific web site). Also, a computer can initiate a connection to another computer (as when one computer makes a connection to another over the Internet). These changes in connections on a network reflect an effort to fulfill a specific purpose. However, the result is often the opposite of the purpose that was meant to be fulfilled. For example, a very large number of users of computers may be redirected to connect to a server for a popular web site at the same time in order to off load use of a congested server. This may result in a degradation of performance (e.g., poor response time for each user) for that web site, rather than improvement.

In another conventional approach to configuring nodes in a network, each node in the network has information about every other node in the network. This information can be used by nodes in the network to change automatically the configuration of the nodes in the network. This approach has the deficiency of requiring that each node have information about every other node in the network, which limits the size of the network that can be reconfigured by this method.

In contrast, the present invention provides methods and techniques that provide for managing a network of nodes by automatically configuring the arrangement of nodes in the network. The techniques of the invention can be applied either when first setting up the node (i.e., tree building) to provide a high level of performance in the newly constructed network or when reconfiguring the network to improve performance.

When a new node is first attaching or connecting to a network using the techniques of the present invention, the new node tries to avoid attaching to the root node of the network to avoid overloading the root node with too many connections. Instead, the new node attempts to attach to a target node (e.g., descendant of the root node) that provides similar performance as the root node (e.g., performance within 10% of the root node). The new or connecting node can obtain network metrics about the performance of a subset (i.e., comparison group) of other nodes in the network, typically starting with a subset composed of the root node and its children. The new node compares the metrics of each node in the subset to select one of the child nodes as a target node and attaches to that node. The newly connected node can then obtain additional network metrics about a revised subset of nodes (e.g., based on the target node and children of the target) and determine whether connecting to a different node other than the current target node (e.g., one of the child nodes of the target) would provide a similar performance for the new node in the network. The newly connected node can repeat the process of selecting revised subsets of nodes and checking their network metrics, until no new target node can be found that has similar performance as the root node.

A node (e.g., reconnecting node) that already has a connection to the network can use a similar technique of comparing network metrics for subsets of nodes when trying to reconnect to a different parent node in the network to improve performance (e.g., if the current parent node is providing degraded performance or has become unavailable). Thus, the techniques of the invention provide for the automatic reconfiguration of the network without human invention, because each node can use the techniques of the invention to obtain network metrics and determine automatically which node to connect (or reconnect) to or remain connected to the target node. Also, each node does not need to have information on every other node in the network, but only on the subset of nodes that the node is considering at a given point in time, and thus the techniques can be used on a very large network (e.g., one thousand nodes or larger).

The relationships among the nodes in the network may represent one or more physical connections among nodes that are computers or other networked devices or logical relationships in an overlay network, in which the logical relationships among nodes in the overlay network typically do not conform to the physical connections among the computers (e.g., the logical relationships represent virtual connections). For example, relationships of interest can be based on physical connections (e.g., connection or disconnection of a physical cable connecting to the network), data communication links (e.g., establishment or termination of a TCP connection over a physical network) or virtual links (e.g., creation or destruction of a logical relationship).

In one environment suitable for use with the invention, a root node provides content that is broadcast (e.g., "multicast") over nodes in a network, such as video data broadcast over a network of nodes in the Internet, which then serve as intermediaries to pass through the content or as servers that provide the content to clients (e.g., end-users who wish to receive the content). In the approach of the invention, nodes in the network may change their relationships, for example, to optimize pathways through the network so as to dynamically optimize the efficiency of the network. In one approach using the techniques of the invention, a connecting (or reconnecting node) measures bottleneck bandwidth indicating the bandwidth available on a path leading from the connecting node through other nodes in the network to the root. If a client wishes to receive content (e.g., video) from the root, the root directs the client to attach itself to one of the servers (e.g., one of the descendant nodes of the root) receiving the broadcast content from the root. In addition, the techniques of the invention allow the root to use a very large network for content distribution with substantially the same performance throughout the network so that content information can be reliably provided to a very large number of clients, using many pathways through the network so that many clients can receive the content without any substantial performance degradation.

In one embodiment, the invention is directed to a method for managing a network of nodes. The method includes requesting an initial set of network metrics for an initial subset of nodes in the network of nodes based on a connecting node attempting to establish a relationship with a target node of the initial subset, receiving the initial set of the network metrics for the initial subset of nodes, and establishing the relationship between the connecting node and the target node of the initial subset based on a comparison of the network metrics in the initial set. Each network metric of the initial set is associated with a respective node from the initial subset and measures a performance aspect of the respective node relative to the network (e.g., bottleneck bandwidth from each node to a root node). Thus, a node connecting to the network can compare the network metrics for a group (i.e., subset) of nodes and establish a relationship with one of the nodes in the group that provides the best performance for the network node in the network.

In another embodiment, the method includes the steps of (i) choosing a revised subset of nodes based on the target node, (ii) requesting a revised set of the network metrics based on the revised subset, (iii) receiving the revised set of the network metrics based on the revised subset, (iv) establishing a selected relationship between the connecting node and a selected target node of the revised subset based on a comparison of the network metrics in the revised set of network metrics and setting the selected target node to be the target node, and (v) repeating steps (i) through (iv) until determining that the selected relationship to the target node is a preferred relationship for the connecting node to the network. Thus, a new node connecting to a network can continually compare network metrics for revised groups of nodes until finding a target node that delivers satisfactory or optimal performance. For example, in a network where a root node is a source that distributes (e.g., multicasts) data (e.g., video or audio data) throughout the network, the new node uses the repeated steps of the method in an attempt to select a node that provides performance that is the same as, or about the same as, what the new node would experience if connected directly to the root node of the network.

In an additional embodiment, the method includes, prior to the step of requesting the initial set of network metrics, the step of selecting the network metric from one or more of a bottleneck bandwidth metric, a latency metric, and a hop count metric. Thus, a node connecting to network has the flexibility of using different types of network metrics. For example, if a new connecting node determines that two nodes in a subset have about the same performance based on a bottleneck bandwidth metric, the new connecting node can use a hop count metric to select between the two nodes.

In a further embodiment, the method includes measuring a set of interactions over the network between the connecting node and the target node and between the connecting node and each node from the initial subset of the nodes. Thus, a connecting node can compare a network metric for the target node with the same network metric for each node in the subset.

In another embodiment, the method includes measuring a set of bottleneck bandwidth metrics between each node of the initial subset and a root node of the network of nodes. For example, the connecting node can measure bottleneck bandwidth metrics from the connecting node through each of the nodes in the subset to the root node, and compare these metrics to the bottleneck bandwidth metric from the connecting node through the current target node to the root node.

In an additional embodiment, the connecting node is a reconnecting node having an existing association with the network and attempting to replace the existing association with a modified association with the network represented by the relationship with the target node. The method includes selecting a plurality of initial subsets of nodes at periodic intervals, and performing the steps of requesting, receiving, and establishing at each periodic interval based on each initial subset of nodes of the plurality of initial subsets of nodes. Thus, a connecting node that is currently connected to a network can periodically select a group of nodes and check the network metrics for that group, in an attempt to find a node (preferably not the root node) to connect to that has better performance (e.g., a higher bottleneck bandwidth metric to the root node) than the current target node.

In a further embodiment, the method includes selecting the initial subsets of nodes based on a lineage selection procedure that selects nodes for each initial subset based on a lineage group of nodes associated with the connecting node in the network. For example, the lineage group can include the current target node and the children of the current target node. In another example, the lineage group can include the current target node (i.e., parent of the connecting node) and the parent of the current target node (i.e., grandparent of the connecting node).

In another embodiment, the method includes selecting the initial subsets of nodes based on a remote selection procedure that selects nodes for each initial subset based on selecting at least one node for each initial subset exclusive of a lineage group of nodes associated with the connecting node. For example, the subset can include a remote or distant node, such as a "cousin" of the connecting node, such as a child of a great-great-uncle to the connecting node.

In a further embodiment, the connecting node does not have a previous relationship to the network prior to the step of requesting the initial set of network metrics, and the initial subset of nodes comprises a root node of the network of nodes. For example, a new node connecting to the network starts with the root node, and compares the performance of connecting to the root node with the performance that the connecting node would receive if connecting to one of the child nodes of the root. If the network metrics (e.g., bottleneck bandwidth) is the same, or about the same, for one of the child nodes, then the connecting node connects to that child node rather than the root node to avoid overloading the root node.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
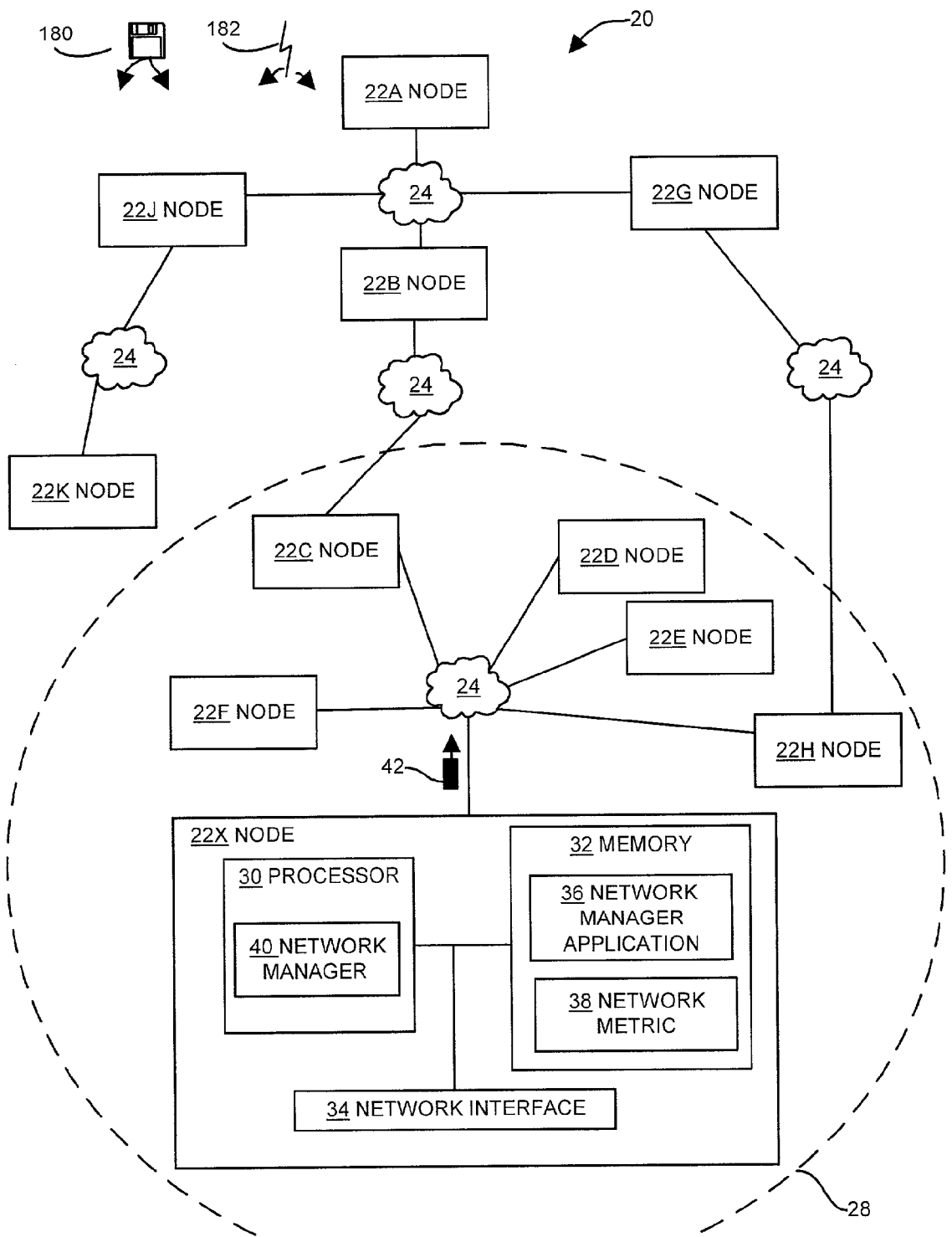
FIG. 1 illustrates an example of a network of nodes configured to operate in accordance with embodiments of the invention.

The invention is directed to techniques for managing a network of nodes by automatically configuring the arrangement of nodes in the network. The techniques of the invention can be applied either when first setting up the network (i.e., tree building) to provide a high level of performance in the newly constructed network or when reconfiguring the network to improve performance.

The network is preferably an overlay network formed from logical relationships (e.g., virtual links) that overlay an underlying network of physical connections (e.g., TCP/IP connections). In the overlay network, the relationships are not required to follow or match the physical connections, and, typically, the relationships are different from the physical connections. For example, one relationship can be based on one or more physical connections (e.g., several hops through routers on the Internet). See also the discussion of overlay networks in Appendix A herein.

When a new node is first attaching or connecting to a network, such as the heirarchical overlay network referenced above, using the techniques of the present invention, the new node tries to avoid attaching to the root node of the network to avoid overloading the root node with too many connections, while attempting to attach to a target node (e.g., descendant of the root node) that provides similar performance as the root node (e.g., performance within 10% of the root node). The new or connecting node can obtain network metrics about the performance of a subset (i.e., comparison group) of other nodes in the network, typically starting with a subset composed of the root node and its children. The new node compares the metrics of each node in the subset to select one of the child nodes as a target node (e.g., a potential parent of the new node) and attaches to that node. By "attaches," what is meant is that the new node presently considers the target node as the most preferred node and to be the parent of the new node at that point in time. The target node may change, however. Such a change may take place when the newly connected node obtains additional network metrics about a revised subset of nodes (e.g., based on the formerly selected target node and any children of the target) to determine whether connecting to a different node other than the current target node (e.g., one of the child nodes of the target) would provide preferable performance for the new node in the network. By "preferable", what is meant is that, for a new node to the network, the performance obtained by connecting to the target node is the same, or about the same as connecting the root node (e.g., within 10% of the root node), and that, for a node already connected to the network, the performance obtained by connecting to a new target node is better (e.g., 10% better or greater) than the performance obtained from connecting to the current target node (i.e., current parent node of the connecting node). The newly connected node can repeat the process of selecting revised subsets of nodes and choosing a target, whenever the new target node has, in a newly selected subset, has metrics preferable than the current target node. The new node then checks the network metrics, until no new target node can be found that has preferable performance compared to the current target of a subset to which the new node has most recently attached. At that point, the new target node becomes the parent node for the new node.

A node (e.g., reconnecting node) that already has a connection to the network can use a similar technique of comparing network metrics for subsets of nodes when trying to determine if a reconnection to a different parent node in the network will improve performance (e.g., if the current parent node is providing degraded performance or has become unavailable). Thus, the techniques of the invention provide for the automatic reconfiguration of the network without human invention, because each node can use the techniques of the invention to obtain network metrics and determine automatically which node to connect (or reconnect) to, or if the node should remain connected to the target node. Also, in one embodiment, each node does not need to have information on every other node in the network, but only on the subset of nodes that the node is considering at a given point in time, and thus the techniques can be used on a very large network (e.g., one thousand nodes or larger).

FIG. 1 illustrates an example of a network 20 of nodes 22 (e.g., nodes 22A through 22H and 22X) configured to operate in accordance with embodiments of the invention. The network 20 includes network connections 24 that connect nodes 22 in the network 20. The network connections 24 are data communication links or connections suitable for connecting computers or digital network devices. In another embodiment, the connections 24 are IP connections (e.g., TCP/IP) that provide communication over an IP network such as the Internet. A node 22 (i.e., nodes 22A through 22H and 22X) is a computer system, in one embodiment of the invention. In another embodiment, the node 22 is a network device, such as a switch, router, bridge, or other network device.

One sample node, node 22X, that is configured according to an embodiment of the invention includes a processor 30, memory 32, and network interface 34 that are all interconnected by internal circuitry (e.g., bus) of the node 22X. In one embodiment, the other nodes 22 are configured in a manner similar to node 22X. The memory 32 includes instructions for a network manager application 36 and one or more network metrics 38. The processor 30 executes the network manager application 36 instructions to form a network manager 40 that performs the functions of managing relationships in the network 20, as described above. In alternate embodiments, the network metric 38 is stored in the memory 32 as data in a database, in a file, or other data storage mechanism suitable for storing data in computerized devices.

Preferably, each node 22 in the network 20 is configured in a manner similar to node 22X. That is, each node 22 includes processor 30, memory 32, and network interface 34 interconnected by internal circuitry (e.g., bus) of the node 22. The memory 32 in each node 22 includes a network metric 38 and network manager application 36. The processor 30 in each node 22 executes the network manager application 36 instructions to form the network manager 40 for that node 22. In alternate embodiments, the network metric 38 is located on a separate node 22 or database server from the other nodes 22, and the network manager 40 executes on a processor 30 on a separate node 22 or server from the other nodes 22.

The network metric 38 is a metric that measures an aspect of performance in the network 20 relative to the node 22 that stores the network metric. For example, the network metric 38 can measure the amount of bottleneck bandwidth available between two nodes. For example, the network metric 38 measures the bottleneck bandwidth available when sending a file between node 22X and node 22B, or some other node 22 (e.g., the root node 22A) in the network 20. In another example, the network metric 38 measures the amount of bandwidth available from a node (e.g., node 22X or 22C) to a root or source node (e.g., 22A), that serves as a source for data (e.g., video) distributed (e.g., broadcast) to all nodes 22 in the network 20. See the discussion of FIG. 7 for a more detailed description of bottleneck bandwidth. In an additional example, the network metric 38 measures the latency for a transmission between two nodes (e.g., the amount of time for data to travel between node 22X and 22A). In a further example, the network metric 38 can measure the hop count (i.e., number of intermediate routers or hops) between two nodes. For example, the connecting node 22X can invoke a trace route utility to determine the number of hops between two nodes 22. In one embodiment, a node 22 can store more than one network metric 38 in the memory 32 for that node 22.

FIG. 1 also illustrates an example of a network metric signal 42 provided by a node (e.g., 22X). The network metric signal 42 is signal sent by a node 22 to other nodes 22 to obtain data for one or more network metrics 38, which indicate a performance aspect of the nodes 22 relative to the network 20. In one embodiment, the network metric signal 42 is a request to obtain network metrics 38 that are stored in the memory 32 of each node 22 that receives the network metric signal 42. For example, the network metric signal 42 is a request (e.g., hypertext transport protocol or HTTP request) over the network connection 24 to other nodes 22 to obtain network metrics 38. In another embodiment, the network metric signal 42 is a signal over the network connection 24 to one or more nodes 22 that measures the network metric 38 directly. For example, the network metric signal 42 is a signal that measures the latency for a transmission of data to another node 22 and to receive a reply (e.g., a transmission of data from node 22X to 22C). In another example, the network metric signal 42 requests the transmission of a sample file (e.g., 10 Kbyte file) from one node 22 to another to measure bottleneck bandwidth between the nodes 22. For example, node 22X sends a network metric signal 42 to node 22A for node 22A to transmit a sample file from node 22A to node 22X in order to measure the bottleneck bandwidth form node 22A to 22X through the intermediate nodes 22C and 22B. See FIG. 7 for a more detailed description of the bottleneck bandwidth metric.

In addition, FIG. 1 illustrates a subset 28, which includes a subset of nodes 22 in the network 22. The subset 28 shown in FIG. 1 is an example subset 28 only, and the subset 28 can include more or fewer nodes 22, as well as other nodes 22, than the ones shown in subset 28 in FIG. 1. For example, in FIG. 1, the subset 28 includes nodes 22X, 22C, 22D, 22E, 22F and 22H. One node 22, such as 22X (i.e., the connecting or new node), uses the subset 28 to obtain network metrics 38 for every other node in the subset 28 in relation to itself and then compares the network metrics 38 to select a node 22 (i.e., target node or current node) in the subset 28 based on the comparison. Then the connecting node 22 (e.g., 22X) establishes a relationship with (e.g., attaches to) that node (e.g. node 22H), as described in further detail for FIG. 2. The connecting node 22 can be a new node 22 that represents a newly initialized node 22 attempting to connect with the network 20, in which the new node 22 attempts to find a target node 22 to attach to that has the same, or approximately the same, performance as the root node (e.g., node 22A), as described in more detail for FIG. 4. Alternatively, the connecting node 22 can be reconnecting node 22 that has an existing relationship to a network 20 that is attempting to establish a different relationship, in which case the reconnecting node attempts to find a target node 22 to attach to that has a better performance than the current target node 22, as described in more detail for FIG. 5.

In one embodiment, a computer program product 180 including a computer readable medium (e.g. one or more CDROM's, diskettes, tapes, etc.) provides software instructions (e.g., the net manager application 36) for the network manager 40. The computer program product 180 can be installed by any suitable software installation procedure, as is well known in the art. In another embodiment, the software instructions can also be downloaded over a wireless connection. A computer program propagated signal product 182 embodied on a propagated signal on a propagation medium (e.g. a radio wave, an infrared wave, a laser wave, sound wave, or an electrical wave propagated over the Internet or other network) provides software instructions for the network manager 40. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer. In another embodiment, the computer readable medium of the computer program product 180 is a propagation medium that the computer can receive and read, such as by receiving the propagation medium and identifying a propagated signal embodied in the propagation medium, as described above for the computer program propagated signal product 182.

Figure 2:
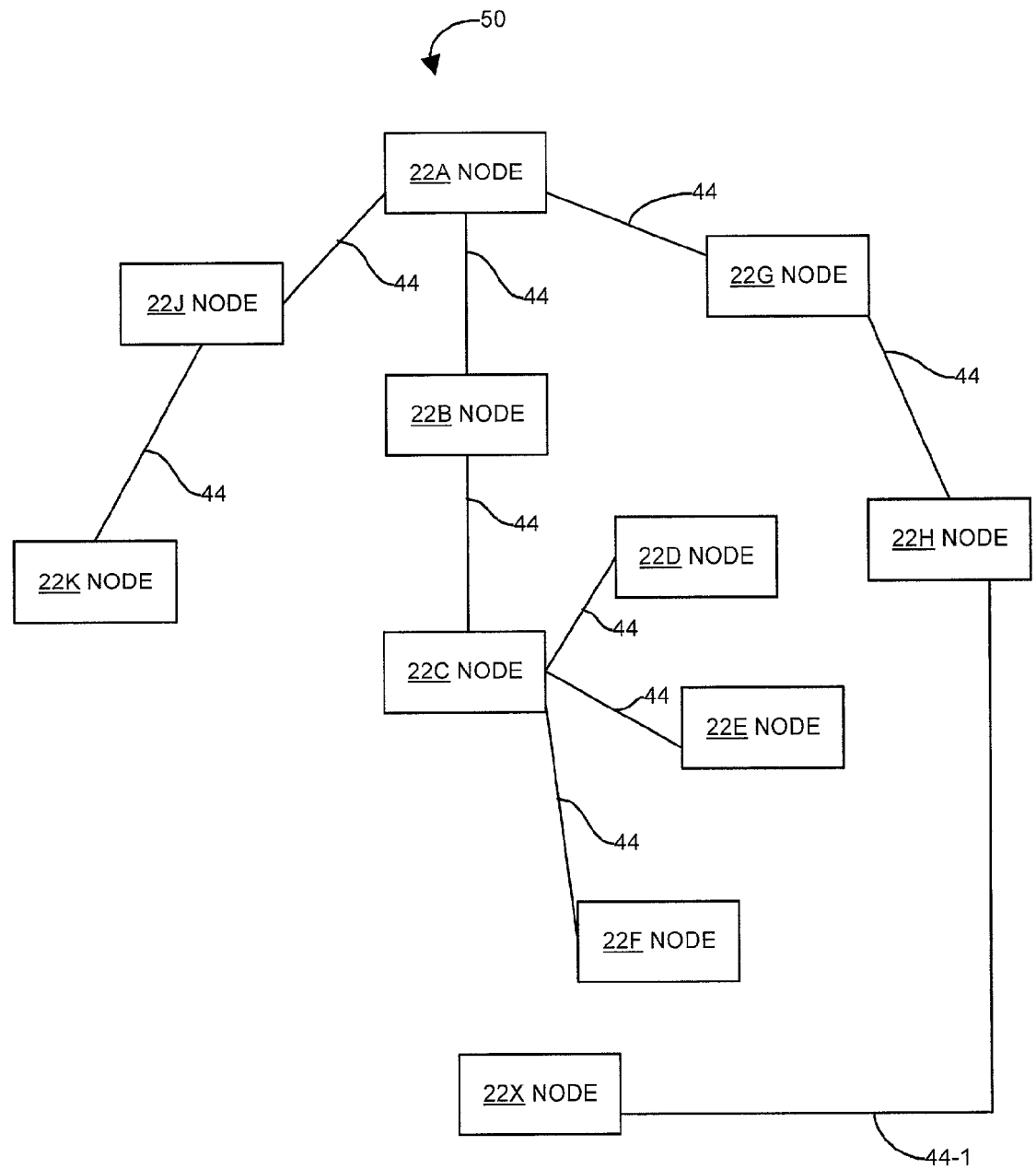
FIG. 2 illustrates an example of relationships among nodes in an overlay network, including a changed relationship for a node in the network, in accordance with embodiments of the invention.

FIG. 2 illustrates an example of relationships 44 among nodes 22 in an overlay network 50, including a changed relationship 44-1 for a node 22X in the network 50, in accordance with embodiments of the invention. The overlay network 50 is a network of virtual connections based generally on the network connections 24 of the network 20 of FIG. 1. The relationships 44 represent relationships among nodes 22 in the overlay network 50. In one embodiment, the relationships 44 are logical relationships, such as a hyperlink relationship (e.g., HTTP hyperlink relationship across the web on the Internet). The relationships 44 shown in FIG. 1 are not required to follow the network connections 24 illustrated in FIG. 1. As shown in FIG. 2, node 22X has established a relationship 44-1 with node 22H.

As described previously for FIG. 1, node 22X issued a network metric signal 42 to obtain network metrics 38 for nodes 22C, 22D, 22E, 22F, and 22H in the subset 28. For the example shown in FIG. 2, suppose that the network metrics 38 indicate that the node 22X can obtain a path to the root node (e.g., 22A) with the highest bottleneck bandwidth, if node 22X establishes a relationship 44-1 in the overlay network 50 with node 22H. Such a relationship 44-1 can also be established by a network metric 38 based on latency (e.g., the amount of time for a network metric signal 42 to travel from node 22A to node 22X).

The additional figures and flowcharts, FIGS. 3–7 provide more detail on the process of establishing relationships 44 based on network metrics 38.

Figure 3:
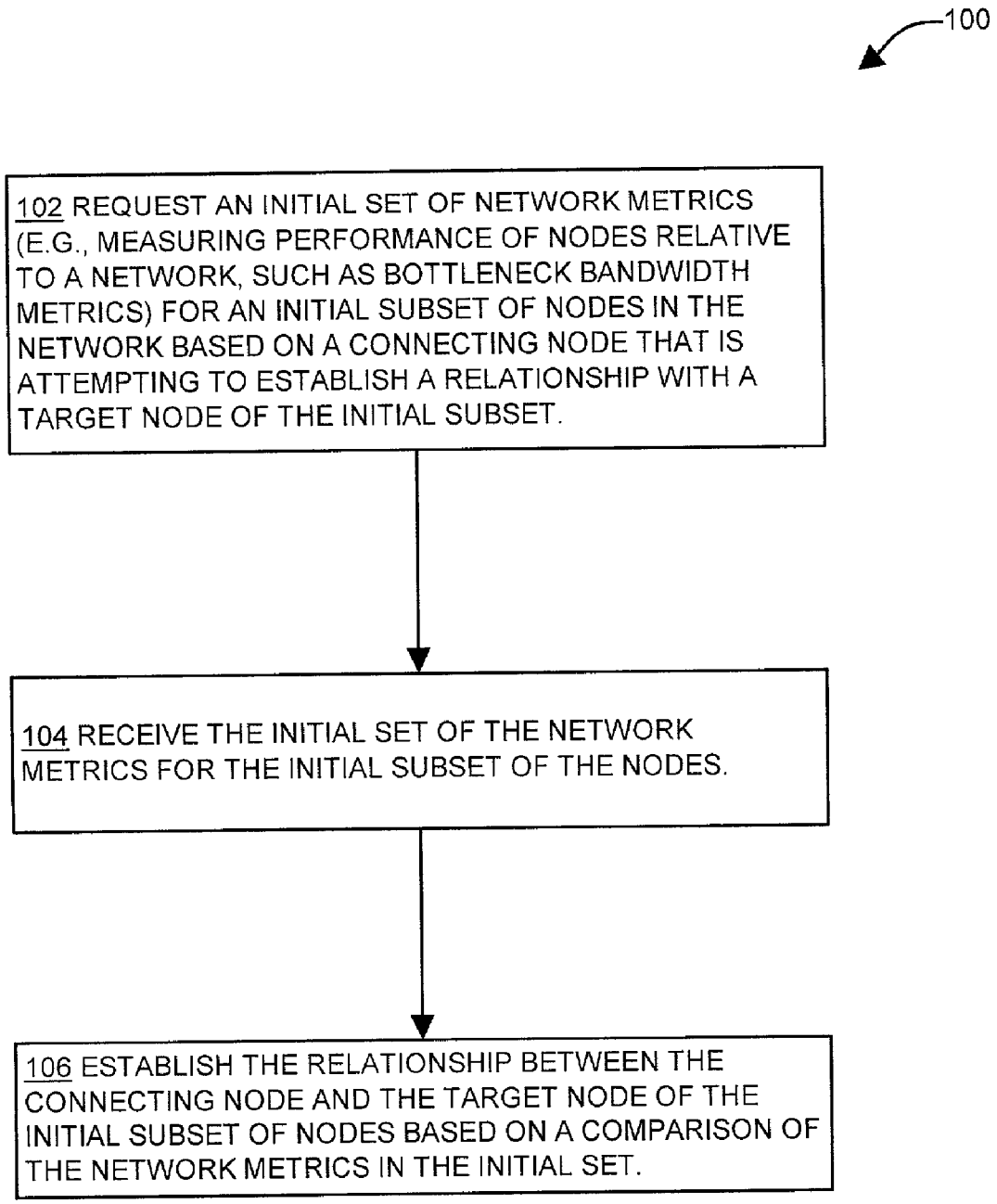
FIG. 3 is a flow chart of a procedure for establishing a relationship between nodes relying on network metrics performed according to embodiments of the invention.

FIG. 3 is a flow chart of a procedure 100 for establishing a relationship 44 between nodes 22 relying on network metrics 38 performed according to embodiments of the invention. In step 102, a node 22 requests an initial set of network metrics 38 for an initial subset of node 28 based a connecting node (e.g., 22X) that is attempting to establish a relationship 44 with a target node (e.g., 22H) of the initial subset 28.

For example, as shown in FIG. 1, the connecting node 22X makes a request 42 for network metrics 38 for nodes in an initial subset 28 of nodes 22C, 22D, 22E, 22F, and 22H. The connecting node 22X selects the nodes 22 in the subset 28 based on a selection procedure. For example, as shown in FIG. 1, the connecting node 22X makes temporary or transient connections (e.g., TCP connections) through network connections 24 with some of the nodes 22 in the network 20. These connections do not yet represent relationships 44. The connecting node 22X can have information on nodes 22 close to it in a network sense (e.g., the node 22C), as well as information on some other nodes 22 in the network 20. In addition, the connecting node 22X can inquire of nodes 22 that node 22X is aware of about other nodes 22 (e.g., connecting node 22X can inquire of nodes 22C about other nodes 22 in the network 20, such as nodes 22D, 22E, and 22F). Alternatively, connecting node 22X can inquire up a line a ancestors (e.g., 22C, 22B, and 22A) to find out about descendants of those nodes 22 (e.g., descendants 22G and 22H that descend from node 22A). However, the techniques of the invention do not require that each node 22 maintain full knowledge of every other node 22 in the network 20.

In a remote selection approach, as will be discussed in more detail later, a connecting node 22X can include a node 22 that is not a child of the parent node 22C. For example, the connecting node 22X can choose a "cousin" in the network 20 (e.g., node 22H) in the subset of nodes 28 in order to compare the network metric 38 for node 22H to the network metrics of the nodes 22 in the subset 28.

In step 104, in FIG. 3, the connecting node 22X receives the initial set of the network metrics 38 for the initial subset of the nodes 28. For example, the connecting node 22X receives a network metric 38 (e.g., bottleneck bandwidth to node 22A or latency time to node 22A) stored by each node 22C, 22D, 22E, 22F, and 22H. In another example, the connecting node 22X issues one or more network metric signals 42 that measure the network metrics 38 directly. For example, the connecting node 22X sends a network metric signal 42 through node 22C and node 22B to node 22A requesting that node 22A transmit sample data (e.g., a sample 10 Kbyte file) from node 22A to the connecting node 22X, which determines the network metric 38 for node 22C (e.g., bottleneck bandwidth from node 22C to 22A) by measuring the time elapsed for the sample data to be sent from node 22A to the connecting node 22X. See FIG. 7 for examples of bottleneck bandwidths.

In step 106, the connecting node 22 establishes the relationship 44 between the connecting node 22 and the target node 22 of the initial subset of nodes 28 based on a comparison of the network metrics 38 in the subset of nodes 28. For example, the connecting node 22X compares the network metrics 38 received in step 104 and selects the network metric 38 (e.g., bottleneck bandwidth) with a preferred value (e.g., the highest bottleneck bandwidth value). Then, the connecting node 22X establishes the relationship 44-1 with the node 22H that has the preferred value for the network metric 38, for the nodes 22 in the subset 28.

The relationship 44-1 can be a new relationship 44, if the connecting node 22X, has not yet established any relationship with any node 22. In this case, the preferred value from the network metric 38 is a performance value that is the same, or about the same (e.g., within 10%), as the performance that the connecting node 22X would receive if connected directly to a root node (e.g., 22A).

Alternatively, the relationship 44-1 is a changed relationship 44 if the connecting node 22X already has a relationship 44 to the overlay network 50 and is attempting to establish the changed relationship 44, in which case the connecting node 22X is referred to as a reconnecting node 22X, because the node 22X is reconnecting again to the same overlay network 50. In this case, the preferred value for the network metric 38 is one that provides an improved performance for the reconnecting node 22X in the new relationship 44-1, compared to a previous relationship 44.

The connecting node 22 (or reconnecting node 22, as described above) then terminates any transient or temporary connections (e.g., TCP connections) with nodes 22 that it does not (or no longer) has any relationships 44 with in the overlay network 50. For example, as shown in FIG. 2, the connecting node 22X has no connections with nodes 22C, 22D, 22E and 22F, because node 22X terminates any temporary connections with these nodes 22 it may have had through network connections 24, after the connecting node 22X establishes the relationship 44-1 with node 22H.

In particular, the example of FIG. 1 shows that the connecting node 22X has temporary connections through network 20 with several other nodes 22, such as 22C, 22D, 22E, 22F, and 22H. In this example, assuming that the overlay network 50 in FIG. 2 is based generally on the network 20 shown in FIG. 1, the connecting node 22X has compared the network metrics 38 for the nodes 22C, 22D, 22E, 22F, and 22H in the subset 28, selected node 22H because it has the best network metric 38, established a relationship 44-1 with node 22H in the overlay network 50 shown in FIG. 2 (e.g., maintaining the relationship 44-1 over the network connection 24 between node 22X and 22H as shown in FIG. 1), and terminates any connections and/or relationships 44 with the other nodes 22C, 22D, 22E, and 22F, in the subset 28.

Figure 4:
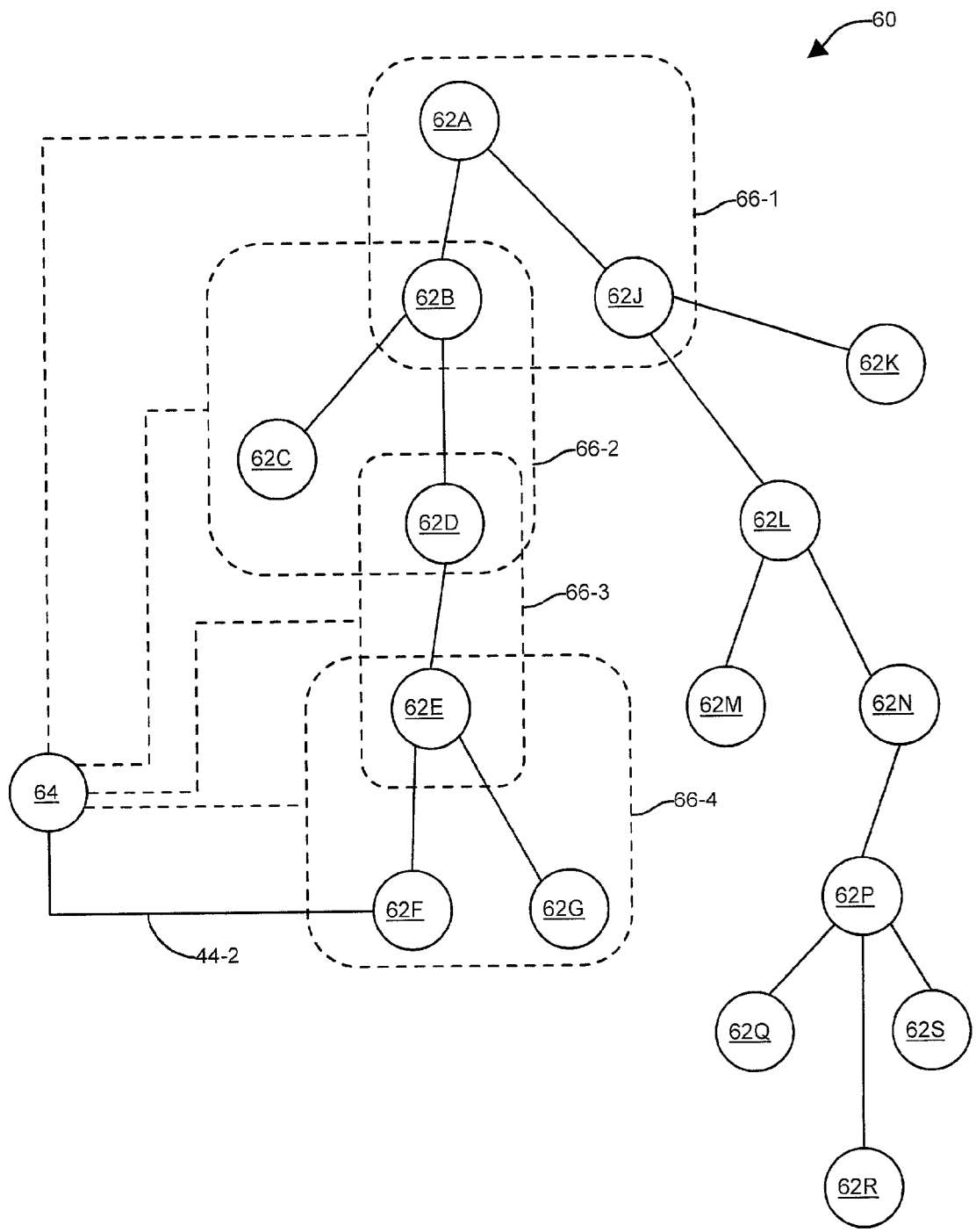
FIG. 4 is an example of a network of nodes, including groups of different nodes used for comparison by a new node that is establishing a relationship with the network.

FIG. 4 is an example of a network 60 of nodes 62, including subsets of nodes 66 (e.g., 66-1, 66-2, 66-3, and 66-4) used for comparison by a connecting node 64 that is establishing a relationship 44-2 with the network 60. The network 60 is an example of the overlay network 50 shown in FIG. 2. The node 62 (e.g., nodes 62A through 62S) is an example of the node 22 shown in FIG. 1 and FIG. 2. The connecting (i.e., new) node 64 is an example of the node 22X and attempts to establish a relationship 44-2 with a node 62 in the network 60. The subsets of nodes 66 are examples of the subset of nodes 28 described for FIG. 1. In general, the connecting node 64 attempts to establish a relationship 44 with a node 62 in the network 60 that provides the same performance, or about the same performance (e.g., within 10% based on network metrics 38), as establishing a relationship 44 directly with the root node (e.g., 62A).

In FIG. 4, a connecting node 64 that does not yet have any relationship with the network 60 selects a subset of nodes 66-1 including 62A, 62B and 62J to use when obtaining and comparing network metrics 38 for those nodes 62A, 62B, 62J, in a manner similar to the earlier description for the flowchart in FIG. 3. For example, the node 62A represents a root node in the overlay network 60 that serves as a source for data (e.g., video data) that is distributed throughout the overlay network 60, and the connecting node 64 is a distribution server node that receives the distributed data from the root (e.g., directly from the root 62A, or indirectly through another node in the network, such as node 62B, that receives the data from the root 62A). In one embodiment, the connecting node 64 knows the network address of the root node 62A and then attempts to attach to the root node 62A, or a descendant of the root node 62A, as described in more detail below.

The connecting node 64 uses a selection procedure to determine a subset of the nodes 66 for which to obtain network metrics 38 for the nodes 62 in the subset 66. In one approach, the connecting node 64 selects a subset 66 based on a lineage selection procedure, which is group of nodes 64 that are descendants of one node 62. In this approach, the connecting node 64 can select a subset 66 based on a parent node 62 and the children nodes 62 of the parent node 62. For example, the subset 66-1 includes the parent node 62A and the children, nodes 62B and 62J of the parent node 62A. A group that only includes a parent and the children nodes 62 is also termed a minimal lineage group (e.g., the subset 66-1). The lineage group can also be based on a group, including nodes 62 from a lineage in the network 60 (e.g., subset 66), such as a parent node 62 and all the descendant nodes 62 of the parent, a parent node 62 and descendants to two generations (e.g., child nodes 62 and grandchild nodes 62), or a node 62 and one or more of its direct ancestors (e.g., a node 62, its parent node 62, and its grandparent node 62). For example, a subset 66 can include a lineage group composed of the parent node 62A, child nodes 62B and 62J, and grandchild nodes 62C, 62D, 62L, and 62K.

In another approach, the connecting node 64 selects subsets 66 of nodes 62 based on a remote selection procedure. In this approach, the connecting node 64 selects the subset 66 by selecting a group of nodes 62 that includes one or more nodes 62 that are not in a lineage group (e.g., other nodes 62 that may be selected by an arbitrary procedure, such as a random procedure, from nodes 62 in the network 60 that are not based on a parent or child node 62 of the previous subset 66).

As shown in FIG. 4, the connecting node 64 selects an initial subset 66-1, which includes node 62A and its child nodes 62B and 62J. The connecting node 64 establishes temporary or transient connections (e.g., TCP/IP connections) with the nodes 62A, 62B, and 62J in the initial subset 66-1. The connecting node 64 then requests the network metrics 38 for the nodes 62A, 62B, and 62J and compares those network metrics 38. For example, the connecting node 64 may compare the bottleneck bandwidth metrics from the connecting node 64 to the source node 62A, depending on whether the connecting node 64 is connected to node 62B, 62J, or directly to the source node 62A. In one embodiment, if the network metrics 38 are the same (or almost identical within some predetermined limit), then the connecting node 64 chooses a new subset of nodes 66-2 based on one of the nodes 62 in the first subset 66-1. In other words, if the network metrics 38 are identical (or almost identical), then the connecting node 64 attempts to "move down" the tree in the network 60, and connect to some node 62 other than the root 62A or the immediate children (e.g., nodes 62B or 62J) of the root node 62A. In one embodiment, the selection procedure follows this approach to avoid overloading the root node 62A or its children 62B or 62J with too many relationships 44. For example, the root node 62A is distributing data (e.g., video over the Internet) to many intermediate nodes 62 and server nodes 62 in the network 60. In this example, each parent node 62 should have a limit on the number of child nodes 62 to avoid inefficiencies and bottlenecks in the distribution of the data.

Thus, the connecting node 64 uses a selection procedure that chooses additional subsets of nodes (e.g., 66-2, 66-3, and 66-4) so that the connecting node 64 establishes a relationship 44 with a node 62 that is not too close to the root 62A (e.g., connecting node 64 establishes a relationship 44-2 with node 62F). In particular, the selection procedure selects a second subset of nodes 66-2 including node 62B and its child nodes 62C and 62D. For example, the connecting node 64 determines that node 62B provided a network metric 38 than node 62J (the other child node of 62A), and then determines to set up a new subset of nodes 66 based on node 62B, as shown by subset 66-2 in FIG. 4 which includes nodes 62B, 62C, and 62D. The connecting node 64 then obtains and compares the network metrics 38 for nodes 62B, 62C, and 62D. For example, the connecting node 64 determines that node 62D provides the same (or about the same) network metric 38 as node 62C, and determines to set up another subset 66 based on node 62D, as shown by subset 66-3 in FIG. 4, which includes only nodes 62D and 62E because node 62D has only one child node 62E.

In one example, the child node 62E has a much worse network metric 38 than node 62D. In this example, the connecting node 64 would establish a relationship 44 with node 62D and not select any other subsets 66. The connecting node 64 can function as a reconnecting node 64 and can, at a latter point in time, then select another subset 66, for example including a remote node, such as node 62K and compare the network metric 38 for node 62D with the network metric 38 for 62K (see the discussion for FIGS. 5 and 6).

Suppose that child node 62E has a network metric 38 (e.g., bottleneck bandwidth) that is the same or similar to the network metric 38 for node 62D. In this case, as shown by subset 66-4 in FIG. 4, the connecting node 64 selects an additional subset 66-4 based on node 62E as the parent node for the subset 66-4. Thus, the subset 66-4 includes the parent node 62E and child nodes 62F and 62G. The connecting node 64 then determines that the network metric 38 for node 62F is better than the network metric 38 for node 62G and then establishes a relationship 44-2 with node 62F.

Suppose that the connecting node 64 determines that the network metrics 38 for node 62F and 62G are the same or closely similar (e.g., bottleneck bandwidth from node 64 through node 62F or node 62G to node 62A). Then the connecting node 64 can select an additional network metric 38 to make a selection between nodes 62F and 62G. For example, the connecting node 64 can measure the hop count (and/or latency) from node 64 to node 62F and the hop count (and/or latency) from node 64 to node 62G. Then, for example, the connecting node 64 determines that the hop count to node 62F is less than the hop count to node 62G and thus establishes a relationship 44-2 with node 62F.

Figure 5:
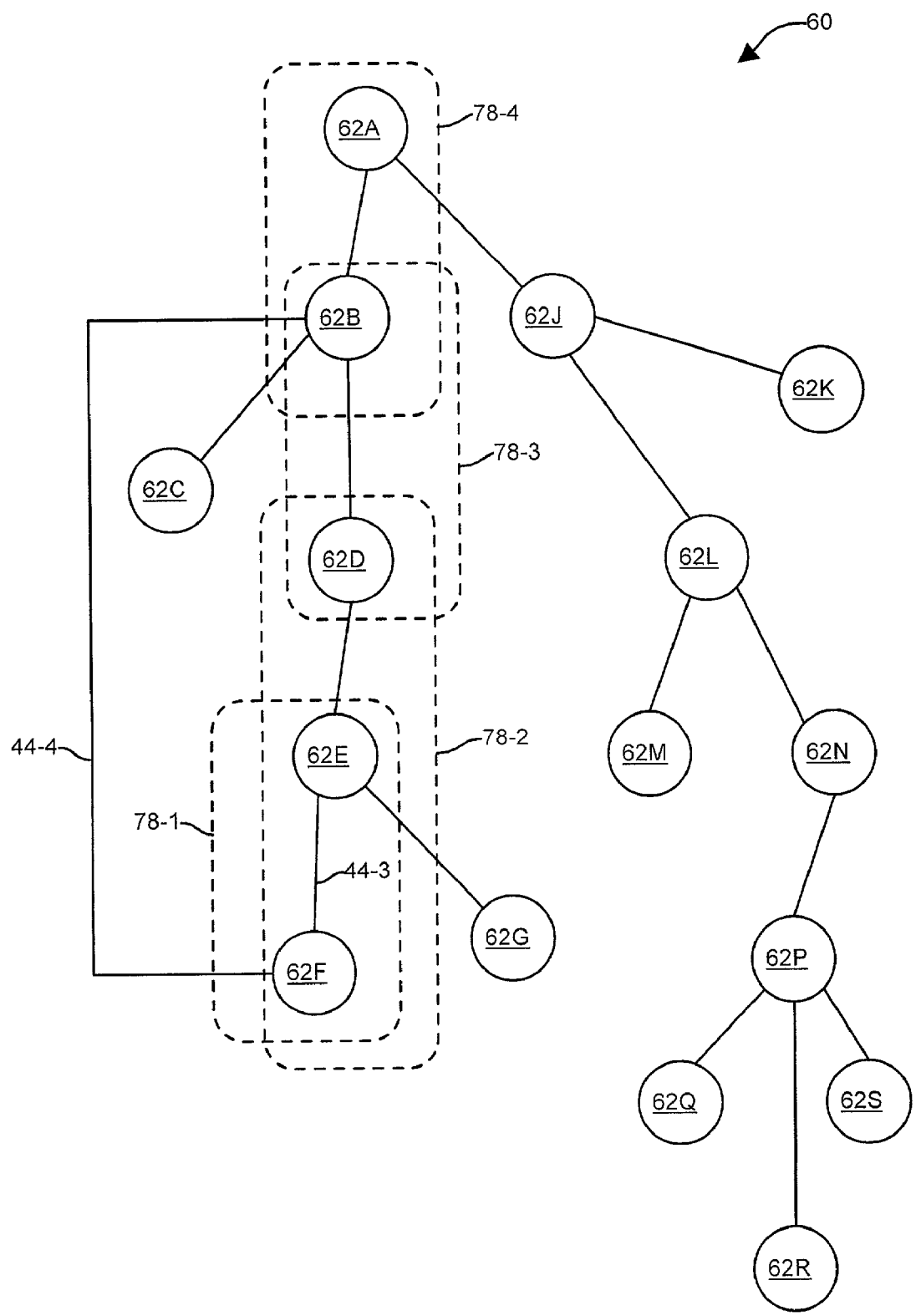
FIG. 5 is an example of a network of nodes, including groups of different nodes used for comparison by a node that has a current relationship to the network and is changing its relationship to the network.

FIG. 5 is an example of a network of nodes 60, including subsets 78 (e.g., 78-1, 78-2, 78-3, and 78-4) of different nodes 62 used for comparison by a reconnecting node 62F that has a current relationship 44-3 to connecting node 62E and is changing to a different relationship 44-4 to node 62B. In general a node 62 (e.g., reconnecting node 62F) can attempt to establish a better relationship 44 (e.g., relationship 44 with a preferred network metric 38) with the network 60. In the example shown in FIG. 5, the reconnecting node 62F can establish subsets 78 based on the parent and/or ancestors of the reconnecting node 62F. For example, the reconnecting node 62F may determine that the performance of the relationship 44-3 through node 62E has been declining (e.g., a decrease in the rate of video data received at node 62F through node 62E that originated from node 62A).

The reconnecting node 62F can then use a selection approach based on a lineage group (e.g., one or more ancestors of 62F). As shown in FIG. 5, subset 78-1 represents an initial subset based on the reconnecting node 62F and its parent node 62E. The reconnecting node 62F then sets up a subset of nodes 78-2 based on the parent node 62E and grandparent 62D of node 62F. The reconnecting node 62F obtains network metrics 38 for the nodes 62E and 62D. For example, the reconnecting node 62F may measure a bottleneck bandwidth from node 62F through nodes 62E, 62D, and 62B to 62A, and compare this bottleneck bandwidth to a bottleneck bandwidth measured from node 62F through nodes 62D and 62B to node 62A if node 62F were connected to node 62D. If the network metrics 38 are the same (e.g., for node 62F with a relationship 44 to node 62E compared to a relationship 44 with node 62D), then the reconnecting node 62F can select a new subset 78-3 that includes node 62D and 62B. The reconnecting node 62F then compares the network metrics 38 for node 62D and 62B. In the example shown in FIG. 5, the reconnecting node 62F determines that node 62B provides a preferred network metric 38 (e.g., higher bottleneck bandwidth metric) than node 62D and establishes a new relationship 44-4 between node 62F and node 62B, while disconnecting the relationship 44-3 between node 62F and node 62E. The reconnecting node 62F can also compare the network metrics 38 for nodes 62B and 62A in subset 78-4. Assume that for the example in FIG. 5, the network metrics for 38 for nodes 62B and 62A are the same (or closely similar). In this case, the reconnecting node 62F chooses to connect to node 62B rather than node 62A, even if the network metric for node 62A is better, in order to avoid overloading the root node 62A with too many relationships 44.

In general, the reconnecting node 62 can set up a subset 78 based on different lineage groups. For example, on a periodic basis (e.g., every minute) the reconnecting node 62 can check the network metrics 38 for all of the nodes 62 in a subset 78 composed of a lineage group (e.g., a lineage group including the grandparent, parent and siblings of the reconnecting node 62). In such an example, the periodic basis can vary depending on the network 60, how large the network 60 is, how long it has been in existence, and other considerations. For example, the periodic basis can be once every minute for a relatively new network 60 and once every thirty minutes for a well established network 60.

In one embodiment, the composition of the subset 78 can vary based on time (e.g., when checking network metrics 38 on a periodic basis). In one approach, the reconnecting node 62 uses a lineage selection procedure, as discussed earlier, to select nodes 62 for the subset 78 based on a lineage group (e.g., nodes 62 in a lineage group based on an ancestor of the reconnecting node 62). For example, for every other check of the network metrics 38 in the subset 78, the reconnecting node 62 can additionally include a great-grandparent node in the subset 78, and for every fourth check of the network metrics 38 in the subset 78, the reconnecting node 62 can additionally include a great-great-grandparent node in the subset 78. In a further embodiment, the reconnecting node 62 can use a remote selection procedure to include at some time interval (e.g., every tenth check of the network metrics 38 in the subset 78) another node 62 selected from another remote part of the network 60. For example, the subset 78 can include one or more nodes that are not part of the lineage group of the reconnecting node (e.g., not a parent or sibling) or not part of the lineage of the reconnecting node (e.g., not a parent, grandparent, great-grandparent, great-great-grandparent, etc.). For example, the subset 78 can include a cousin node 62 (e.g., child of a great-uncle node to the reconnecting node 62). Furthermore, the reconnecting node 62 can use a remote selection procedure to select one or more nodes 62 arbitrarily (e.g., by random selection) from the network 60 to add to the subset 78, as long as the selected node 62 is not part of the lineage group (e.g., the reconnecting node 62 and its direct ancestor nodes 62) that is already included in the subset 78 (e.g., not a parent or grandparent of the reconnecting node 62).

Figure 6:
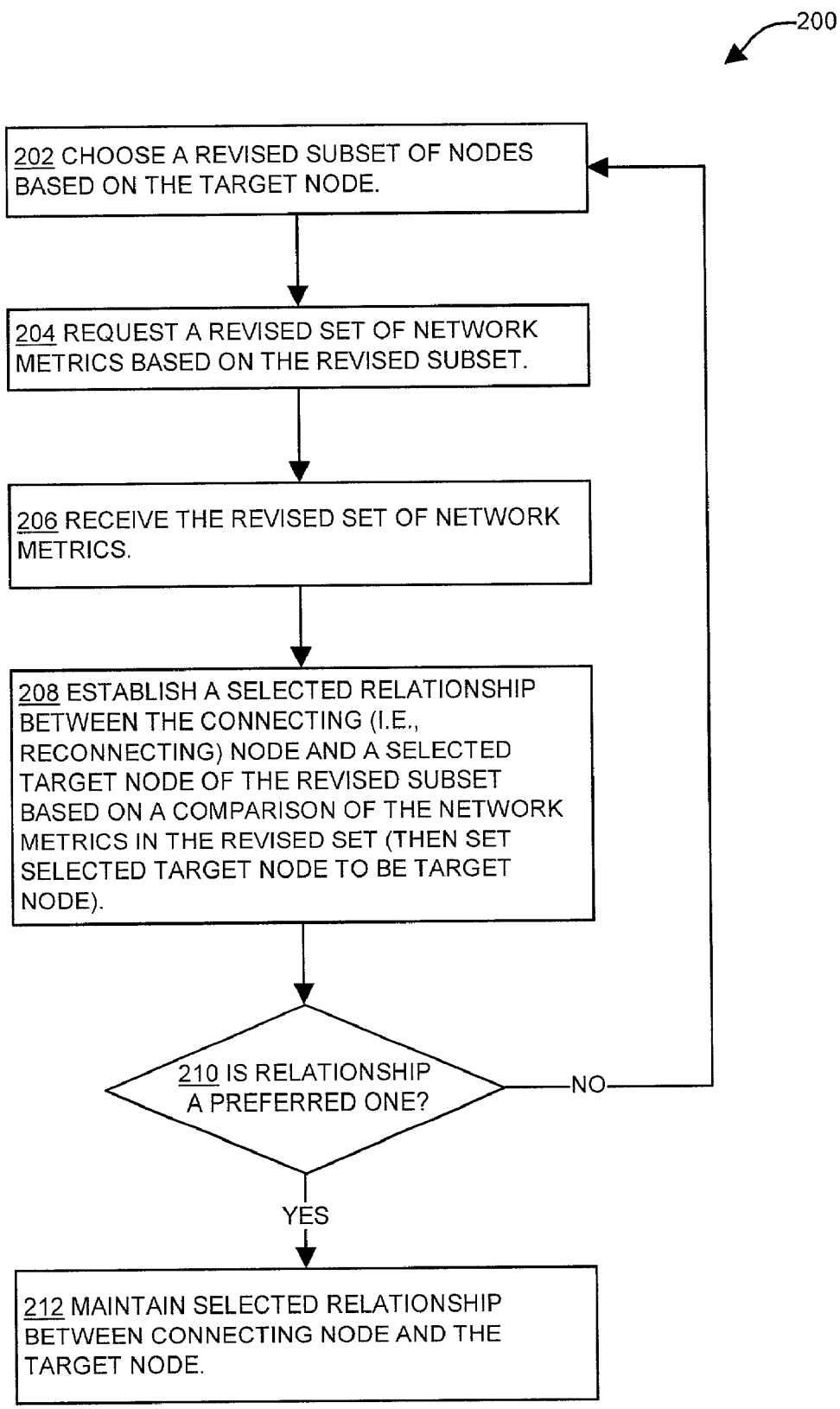
FIG. 6 is a flow chart of a procedure for changing a relationship with a network for a node that has a current relationship to the network performed according to embodiments of the invention.

FIG. 6 is a flow chart of a procedure 200 for changing a relationship 44 with a network 60 for a node 62 that has a current relationship 44 to the network 60 performed according to embodiments of the invention.

In step 202 of FIG. 6, a node 62 chooses a revised subset of nodes 78 based on the target node 62. For example, as shown in FIG. 5, a connecting node 62F (also termed the reconnecting node) has a current relationship 44-3 to a target node 62E, and the connecting node 62F chooses a revised subset 78-2 (e.g., a revision of the initial subset 78-1) based on the target node 62E that includes the connecting node 62F, its parent node 62E, and the grandparent node 62D.

In step 204, the connecting node 62 requests a revised set of network metrics 38 based on the revised subset 78. For example, the connecting node 62F requests the network metrics 38 for the revised subset 78-2 of FIG. 5, including nodes 62D and 62E (e.g., sends network metric signals 42 to nodes 62D and 62E).

In step 206, the connecting node 62, receives the revised set of network metrics 38. For example, the connecting node 62F may measure a bottleneck bandwidth from node 62F through node 62E, 62D, and 62B to 62A, and compare this bottleneck bandwidth to a bottleneck bandwidth measured from node 62F through node 62D, and 62B to node 62A if node 62F were connected to node 62D.

In step 208, the connecting node 62 establishes a selected relationship 44 (e.g., temporary relationship that is potentially a new relationship) between the connecting node 62 and a selected target node 62 (e.g., newly chosen target node 62) of the revised subset 78 based on a comparison of the network metrics 38 for the revised subset 78. The connecting node 62 regards the newly selected target node 62 as the target node 62 for the selected relationship 44. For example, the connecting node 62F establishes a selected relationship 44 between the connecting node 62F and the selected target node 62D.

In step 210, the connecting node 62 determines if the selected relationship 44 is a preferred one. In one example, does the selected relationship 44 have a higher bandwidth value for the target node 62 associated with the selected relationship 44. In a more particular example, the connecting node 62F determines that the network metric 38 for node 62D is not better (e.g., does not have a higher bandwidth value) than the network metric 38 for the node 62E that has the existing relationship 44-3.

If the selected relationship 44 is not a preferred one, then the connecting node 62 returns to step 202 and chooses a revised subset of nodes 78 based on the target node 62. For example, the connecting node 62F chooses a revised subset of nodes 78-3 as shown in FIG. 5, based on the target node 62D (i.e., the revised subset 78-3 includes the target node 62D and its parent node 62B). The connecting node 62F then considers whether to establish a new relationship 44 using the new revised subset 78-3.

In step 212, if the selected relationship 44 is a preferred relationship, then the connecting node 62 maintains the selected relationship 44 between the connecting node 62 and the target node 62. For example, when considering the revised subset 78-3 that includes nodes 62B and 62D, the connecting node 62F determines that node 62B has a preferred network metric 38 and then maintains the relationship 44-4 between nodes 62F and 62B as the ongoing relationship for node 62F with the network 60.

In general, the steps in FIG. 6 can be applied to a reconnecting node (e.g., 62F in FIG. 5) that attempts to establish a new relationship 44 with the network 60 (e.g., as reflected in the subsets 78 of FIG. 5) as described above, or to a newly connected node (e.g., 64 in FIG. 4) that has established a temporary relationship 44 with a network 60 and is attempting to refine or change that temporary relationship 44 (as reflected in the subsets of 66 of FIG. 4).

Figure 7:
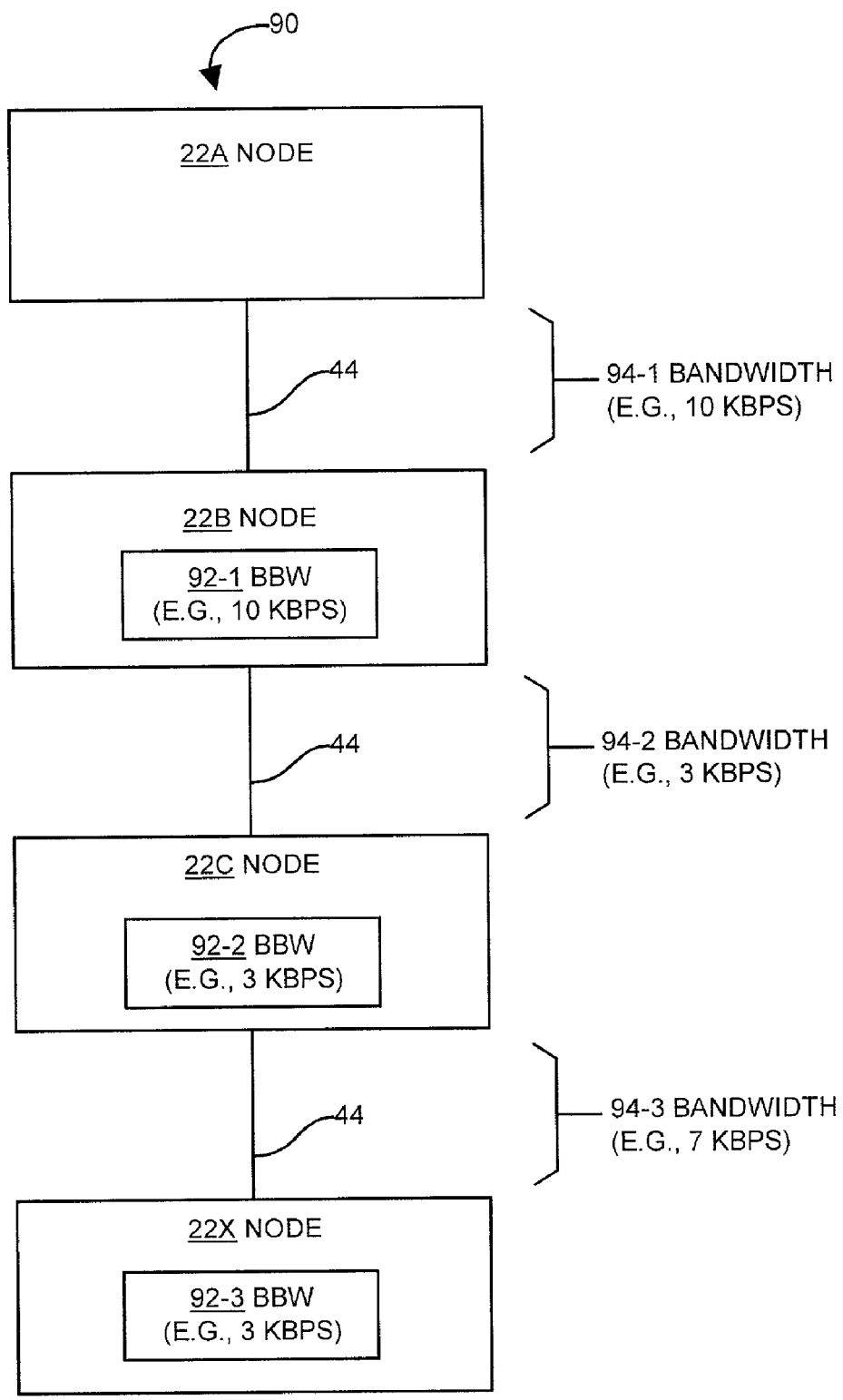
FIG. 7 illustrates an example of a chain of nodes in a network showing bottleneck bandwidth metrics for each node, in accordance with embodiments of the invention.

FIG. 7 illustrates an example of a chain of nodes in a network 90 showing bottleneck bandwidth metrics 92 (e.g., 92-1, 92-2, and 92-3) for each node 22 (e.g., 22A, 22B, 22C, and 22X) in accordance with embodiments of the invention. FIG. 7 also shows the bandwidth 94 (e.g., 94-1, 94-2, and 94-3) between each node 22. The bandwidth 94-1 (e.g., 10 KBPS or kilobytes per second) indicates the bandwidth available using a relationship 44 between nodes 22A and 22B and is the same as the bottleneck bandwidth 92-1 (e.g., 10 KBPS). The bandwidth 94-2 (e.g., 3 KBPS) indicates the bandwidth available using a relationship 44 between nodes 22B and 22C, and, in this example, the bottleneck bandwidth 92-2 for node 22C is restricted to the bandwidth (e.g., 3 KPBS) available between nodes 22B and 22C. The bandwidth 94-3 (e.g., 7 KBPS) indicates the bandwidth available using a relationship 44 between nodes 22C and 22X. In this example, the bottleneck bandwidth 92-3 (e.g., 3 KBPS) for node 22X is restricted to the minimum bandwidth available in the chain of nodes from node 22X to 22A, which is the bandwidth 94-2 (e.g., 3 KBPS) available between node 22C and 22B.

While this invention has been particularly shown and described with references to preferred embodiments thereof, it will be understood by those skilled in the art that various changes in form and details may be made therein without departing from the spirit and scope of the invention as defined by the claims that follow Appendix A.

For example, the invention is suitable for use with a network 60 of nodes 62 that are connected by any suitable underlying physical connections, such as a local area network (LAN), modem connections, channel connections, or other connections. In addition, a node 22 or node 62 can be any communicating entity, such as a computer or other electronic device, software module, or humans.

For example, the network metrics 38 can be maintained and stored by one node 62 in a network 60, or by some of the nodes 62 in the network 60. The network metrics 38 can also be maintained and stored by a computer or server separate from the network 60, that maintains data on the network 60.

In addition, a source node 62 (e.g., node that distributes video data throughout the network 60) is not required to be at the root of a tree of nodes 62, but can be a node 62 located elsewhere in the network 60. Also, the network 60 is not required to be a tree, but can have other structures (e.g., having relationships 44 that form cross links among branches in the tree, or form cyclic patterns of links in the network 60) forming a graph of nodes 62 that is not a tree.

The following appendix, entitled "Overcast: Reliable Multicasting with an Overlay Network", provides an example of a system that uses one approach of the invention and is meant to be considered as part of the detailed disclosure of embodiments of the invention. The system described in Appendix A, however, is to be considered as an example only, and it is to be understood that this example is not meant to be limiting of the invention.

Appendix A

Overcast: Reliable Multicasting with an Overlay Network

Overcast is an application-level multicasting system that can be incrementally deployed using today's Internet infrastructure. These properties stem from Overcast's implementation as an overlay network. An overlay network consists of a collection of nodes placed at strategic locations in an existing network fabric. These nodes implement a network abstraction on top of the network provided by the underlying substrate network.

Overcast provides scalable and reliable single-source multicast using a simple protocol for building efficient data distribution trees that adapt to changing network conditions. To support fast joins, Overcast implements a new protocol for efficiently tracking the global status of a changing distribution tree.

Results based on simulations confirm that Overcast provides its added functionality while performing competitively with IP Multicast. Simulations indicate that Overcast quickly builds bandwidth-efficient distribution trees that, compared to IP Multicast, provide 70%–100% of the total bandwidth possible, at a cost of somewhat less than twice the network load. In addition, Overcast adapts quickly to changes caused by the addition of new nodes or the failure of existing nodes without causing undue load on the multicast source.

1 Introduction

Overcast is motivated by real-world problems faced by content providers using the Internet today. How can bandwidth-intensive content be offered on demand? How can long-running content be offered to vast numbers of clients? Neither of these challenges are met by today's infrastructure, though for different reasons. Bandwidth-intensive content (such as 2 Mbit's video) is impractical because the bottleneck bandwidth between content providers and consumers is considerably less than the natural consumption rate of such media. With currently available bandwidth, a 10-minute news clip might require an hour of download time. On the other hand, large-scale (thousands of simultaneous viewers) use of even moderate-bandwidth live video streams (perhaps 128 Kbit's) is precluded because network costs scale linearly with the number of consumers.

Overcast attempts to address these difficulties by combining techniques from a number of other systems. Like IP Multicast, Overcast allows data to be sent once to many destinations. Data are replicated at appropriate points in the network to minimize bandwidth requirements while reaching multiple destinations. Overcast also draws from work in caching and server replication. Overcast's multicast capabilities are used to fill caches and create server replicas throughout a network. Finally Overcast is designed as an overlay network, which allows Overcast to be incrementally deployed. As nodes are added to an Overcast system the system's benefits are increased, but Overcast need not be deployed universally to be effective.

An Overcast system is an overlay network consisting of a central source (which may be replicated for fault tolerance), any number of internal Overcast nodes (standard PCs with permanent storage) sprinkled throughout a network fabric, and standard HTTP clients located in the network. Using a simple tree-building protocol, Overcast organizes the internal nodes into a distribution tree rooted at the source. The tree-building protocol adapts to changes in the conditions of the underlying network fabric. Using this distribution tree, Overcast provides large-scale, reliable multicast groups, especially suited for on-demand and live data delivery. Overcast allows unmodified HTTP clients to join these multicast groups.

Overcast permits the archival of content sent to multicast groups. Clients may specify a starting point when joining an archived group, such as the beginning of the content. This feature allows a client to "catch up" on live content by tuning back ten minutes into a stream, for instance. In practice, the nature of a multicast group will most often determine the way it is accessed. A group containing stock quotes will likely be accessed live. A group containing a software package will likely be accessed from start to finish; "live" would have no meaning for such a group. Similarly, high-bandwidth content can not be distributed live when the bottleneck bandwidth from client to server is too small. Such content will always be accessed relative to its start.

We have implemented Overcast and used it to create a data distribution system for businesses. Most current users distribute high quality video that clients access on demand. These businesses operate geographically distributed offices and need to distribute video to their employees. Before using Overcast, they met this need with low resolution Web accessible video or by physically reproducing and mailing VHS tapes. Overcast allows these users to distribute high-resolution video over the Internet. Because high quality videos are large (Approximately 1 Gbyte for a 30 minute MPEG-2 video), it is important that the videos are efficiently distributed and available from a node with high bandwidth to the client. To a lesser extent, Overcast is also being used to broadcast live streams. Existing Overcast networks typically contain tens of nodes and are scheduled to grow to hundreds of nodes.

The main challenge in Overcast is the design and implementation of protocols that can build efficient, adaptive distribution trees without knowing the details of the substrate network topology. The substrate network's abstraction provides the appearance of direct connectivity between all Overcast nodes. Our goal is to build distribution trees that maximize each node's bandwidth from the source and utilize the substrate network topology efficiently. For example, the Overcast protocols should attempt to avoid sending data multiple times over the same physical link. Furthermore, Overcast should respond to transient failures or congestion in the substrate network.

Figure 8:
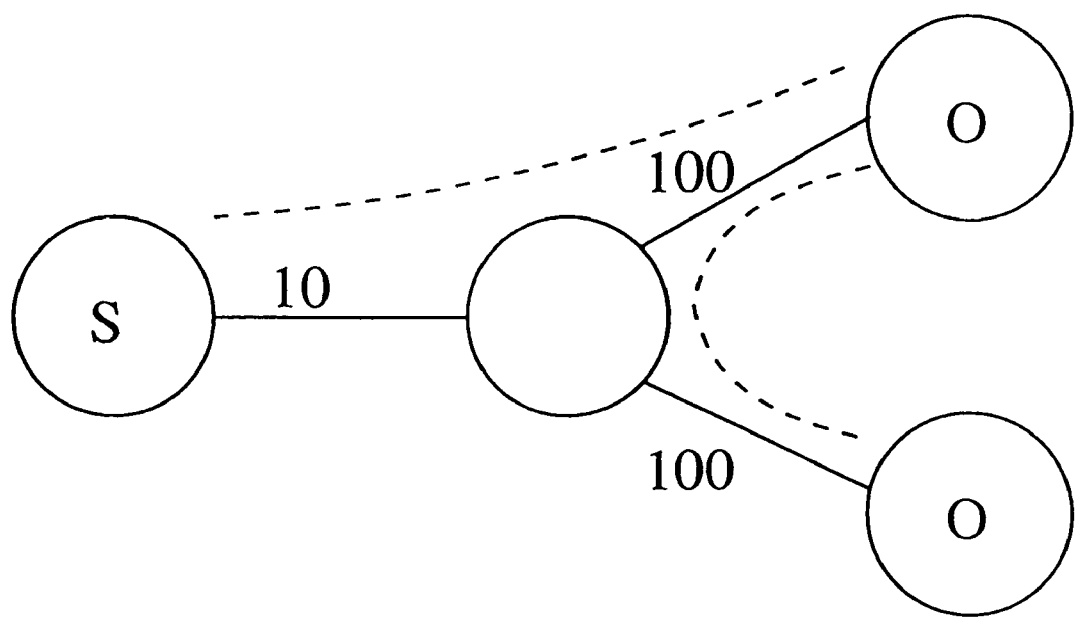
FIG. 8 is an example network and Overcast topology. The straight lines are the links in the substrate network. These links are labeled with bandwidth in Mbit's. The curved lines represent connections in the Overlay network. S represents the source, O represents two Overcast nodes.

Consider the simple network depicted in FIG. 8.

The network substrate consists of a root node (R), two Overcast nodes (O), a router, and a number of links. The links are labeled with bandwidth in Mbit's. There are three ways of organizing the root and the Overcast nodes into a distribution tree. The organization shown optimizes bandwidth by using the constrained link only once.

The contributions of this paper are:

A novel use of overlay networks. We describe how reliable, highly-scalable, application-level multicast can be provided by adding nodes that have permanent storage to the existing network fabric.

A simple protocol for forming efficient and scalable distribution trees that adapt to changes in the conditions of the substrate network without requiring router support.

A novel protocol for maintaining global status at the root of a changing distribution tree. This state allows clients to join an Overcast group quickly while maintaining scalability.

Results from simulations that show Overcast is efficient. Overcast can scale to a large number of nodes; its efficiency approaches router-based systems; it quickly adjusts to configuration changes; and a root can track the status of an Overcast network in a scalable manner.

Section 2 details Overcast's relation to prior work. Overcast's general structure is examined in Section 3, first by describing overlay networks in general, then providing the details of Overcast. Section 4 describes the operation of the Overcast network performing reliable application-level multicast. Finally, Section 5 examines Overcast's ability to build a bandwidth-efficient overlay network for multicasting and to adapt efficiently to changing network conditions.

2 Related Work

Overcast seeks to marry the bandwidth savings of an IP Multicast distribution tree with the reliability and simplicity of store-and-forward operation using reliable communication between nodes. Overcast builds on research in IP multicast, content distribution (caching, replication, and content routing), and overlay networks. We discuss each in turn.

IP Multicast IP Multicast is designed to provide efficient group communication as a low level network primitive. Overcast has a number of advantages over IP Multicast. First, as it requires no router support, it can be deployed incrementally on existing networks. Second, Overcast provides bandwidth savings both when multiple clients view content simultaneously and when multiple clients view content at different times. Third, while reliable multicast is the subject of much research, problems remain when various links in the distribution tree have widely different bandwidths. A common strategy in such situations is to decrease the fidelity of content over lower bandwidth links. Although such a strategy has merit when content must be delivered live, Overcast also supports content types that require bit-for-bit integrity, such as software.

Content Distribution Systems Others have advocated distributing content servers in the network fabric, from initial proposals to larger projects, such as Adaptive Caching, Push Caching, Harvest, Dynamic Hierarchical Caching, Speculative Data Dissemination, and Application-Level Replication. Overcast extends this previous work by building an overlay network using a self-organizing algorithm. This algorithm, operating continuously, not only eliminates the need for manually determined topology information when the overlay network is created, but also reacts transparently to the addition or removal of nodes in the running system. Initialization, expansion, and fault tolerance are unified.

A number of service providers (e.g., Adero, Aka-mai, and Digital Island) operate content distribution networks, but in-depth information describing their internals is not public information. FastForward's product is described below as an example of an overlay network.

Overlay Networks A number of research groups and service providers are investigating services based on overlay networks. In particular, many of these services, like Overcast, exist to provide some form of multicast or content distribution. These include End System Multicast, Yoid (formerly Yallcast), X-bone, RMX, FastForward, and PRISM. All share the goal of providing the benefits of IP multicast without requiring direct router support or the presence of a physical broadcast medium. However, except Yoid, these approaches do not exploit the presence of permanent storage in the network fabric.

End System Multicast is an overlay network that provides small-scale multicast groups for teleconferencing applications; as a result the End System Multicast protocol (Narada) is designed for multisource multicast. The Overcast protocols different from Narada in order to support large-scale multicast groups.

X-bone is also a general-purpose overlay network that can support many different network services. The overlay networks formed by X-bone are meshes, which are statically configured.

RMX focuses on real-time reliable multicast. As such, its focus is on reconciling the heterogeneous capabilities and network connections of various clients with the need for reliability. Therefore their work focuses on semantic rather than data reliability. For instance, RMX can be used to change high resolution images into progressive JPEGs before transmittal to underprovisioned clients. Our work is less concerned with interactive response times. Overcast is designed for content that clients are interested in only at full delity, even if it means that the content does not become available to all clients at the same time.

FastForward Networks produces a system sharing many properties with RMX. Like RMX, FastForward focuses on real-time operation and includes provisions for intelligently decreasing the bandwidth requirements of rich media for low-bandwidth clients. Beyond this, FastForward's product differs from Overcast in that its distribution topology is statically configured by design. Within this statically configured topology, the product can pick dynamic routes. In this way FastForward allows experts to configure the topology for better performance and predictability while allowing for a limited degree of dynamism. Overcast's design seeks to minimize human intervention to allow its overlay networks to scale to thousands of nodes. Similarly, FastForward achieves fault tolerance by statically configuring distribution topologies to avoid single points of failure, while Overcast seeks to dynamically reconfigure its overlay in response to failures.

Active Networks One may view overlay networks as an alternative implementation of active networks. In active networks, new protocols and application-code can dynamically be downloaded into routers, allowing for rapid innovation of network services. Overcast avoids some of the hard problems of active networks by focusing on a single application; it does not have to address the problems created by dynamic downloading of code and sharing resources among multiple competing applications. Furthermore, since Overcast requires no changes to existing routers, it is easier to deploy. The main challenge for Overcast is to be competitive with solutions that are directly implemented on the network level.

3 The Overcast Network

This section describes the overlay network created by the Overcast system. First, we argue the benefits and drawbacks of using an overlay network. After concluding that an overlay network is appropriate for the task at hand, we explore the particular design of an overlay network to meet Overcast's demands. To do so, we examine the key design requirement of the Overcast network—single source distribution of bandwidth-intensive media on today's Internet infrastructure. Finally we illustrate the use of Overcast with an example.

3.1 Why Overlay?

Overcast was designed to meet the needs of content providers on the Internet. This goal led us to an overlay network design. To understand why we chose an overlay network, we consider the benefits and drawbacks of overlays. An overlay network provides advantages over both centrally located solutions and systems that advocate running code in every router. An overlay network is:

Incrementally Deployable An overlay network requires no changes to the existing Internet infrastructure, only additional servers. As nodes are added to an overlay network, it becomes possible to control the paths of data in the substrate network with ever greater precision.

Adaptable Although an overlay network abstraction constrains packets to over a constrained set of links, that set of links is constantly being optimized over metrics that matter to the application. For instance, the overlay nodes may optimize latency at the expense of bandwidth. The Detour Project has discovered that there are often routes between two nodes with less latency than the routes offered by today's IP infrastructure. Overlay networks can find and take advantage of such routes.

Robust By virtue of the increased control and the adaptable nature of overlay networks, an overlay network can be more robust than the substrate fabric. For instance, with a sufficient number of nodes deployed, an overlay network may be able to guarantee that it is able to route between any two nodes in two independent ways. While a robust substrate network can be expected to repair faults eventually, such an overlay network might be able to route around faults immediately.

Customizable Overlay nodes may be multipurpose computers, easily outfitted with whatever equipment makes sense.

For example, Overcast makes extensive use of disk space. This allows Overcast to provide bandwidth savings even when content is not consumed simultaneously in different parts of the network.

Standard An overlay network can be built on the least common denominator network services of the substrate network. This ensures that overlay traffic will be treated as well as any other. For example, Overcast uses TCP (in particular, HTTP over port 80) for reliable transport. TCP is simple, well understood, network friendly, and standard. Alternatives, such as a "home grown" UDP protocol with retransmissions, are less attractive by all these measures. For better or for worse, creativity in reliable transport is a losing battle on the Internet today. On the other hand, building an overlay network faces a number of interesting challenges. An overlay network must address:

Management complexity The manager of an overlay network is physically far removed from the machines being managed. Routine maintenance must either be unnecessary or possible from afar, using tools that do not scale in complexity with the size of the network. Physical maintenance must be minimized and be possible by untrained personnel.

The real world In the real world, IP does not provide universal connectivity. A large portion of the Internet lies behind firewalls. A significant and growing share of hosts are behind Network Address Translators (NATs), and proxies. Dealing with these practical issues is tedious, but crucial to adoption.

Inefficiency An overlay can not be as efficient as code running in every router. However, our observation is that when an overlay network is small, the inefficiency, measured in absolute terms, will be small as well—and as the overlay network grows, its efficiency can approach the efficiency of router based services.

Information loss Because the overlay network is built on top of a network infrastructure (IP) that offers nearly complete connectivity (limited only by firewalls, NATs, and proxies), we expend considerable effort deducing the topology of the substrate network.

The first two of these problems can be addressed and nearly eliminated by careful design. To address management complexity, management of the entire overlay network can be concentrated at a single site. The key to a centralized-administration design is guaranteeing that newly installed nodes can boot and obtain network connectivity without intervention. Once that is accomplished, further instructions may be read from the central management server.

Firewalls, NATs and HTTP proxies complicate Overcast's operation in a number of ways. Firewalls force Overcast to open all connections "upstream" and to communicate using HTTP on port 80. This allows an Overcast network to extend exactly to those portions of the Internet that allow web browsing. NATs are devices used to multiplex a small set of IP addresses (often exactly one) over a number of clients. The clients are configured to use the NAT as their default router. At the NAT, TCP connections are rewritten to use one of the small number of IP addresses managed by the NAT. TCP port numbers allow the NAT to demultiplex return packets back to the correct client. The complication for Overcast is that client IP addresses are obscured. All Overcast nodes behind the NAT appear to have the same IP address. HTTP proxies have the same effect.

Although private IP addresses are never directly used by external Overcast nodes, there are times when an external node must correctly report the private IP address of another node. For example, an external node may have internal children. During tree building a node must report its children's' addresses so that they may be measured for suitability as parents themselves. Only the private address is suitable for such purposes. To alleviate this complication all Overcast messages contain the sender's IP address in the payload of the message.

The final two disadvantages are not so easily dismissed. They represent the true tradeoff between overlay networks and ubiquitous router based software. For Overcast, the goal of instant deployment is important enough to sacrifice some measure of efficiency. However, the amount of inefficiency introduced is a key metric by which Overcast should be judged.

3.2 Single-Source Multicast

Overcast is a single-source multicast system. This contrasts with IP Multicast which allows any member of a multicast group to send packets to all other members of the group. Beyond the fact that this closely models our intended application domain, there are a number of reasons to pursue this particular refinement to the IP Multicast model.

Simplicity Both conceptually and in implementation, a single-source system is simpler than an any source model. For example, a single-source provides an obvious rendezvous point for group joins.

Optimization It is difficult to optimize the structure of the overlay network without intimate knowledge of the substrate network topology. This only becomes harder if the structure must be optimized for all paths.

Address space Single-source multicast groups provide a convenient alternative to the limited IP Multicast address space. The namespace can be partitioned by first naming the source, then allowing further subdivision of the source's choosing. In contrast, IP Multicast's address space is limited, and without obvious administration to avoid collisions amongst new groups.

On the other hand, a single-source model clearly offers reduced functionality compared to a model that allows any group member to multicast. As such, Overcast is not appropriate for applications that require extensive use of such a model. However, many applications which appear to need multi-source multicast, such as a distributed lecture allowing questions from the class, do not. In such an application, only one "non-root" sender is active at any particular time. It would be a simple matter for the sender to unicast to the root, which would then perform the true multicast on the behalf of the sender. A number of projects have used or advocated such an approach.

3.3 Bandwidth Optimization

Overcast is designed for distribution from a single source. As such, small latencies are expected to be of less importance to its users than increased bandwidth. Extremely low latencies are only important for applications that are inherently two-way, such as video conferencing. Overcast is designed with the assumption that broadcasting "live" video on the Internet may actually mean broadcasting with a ten to fifteen second delay. Overcast distribution trees are built with the sole goal of creating high bandwidth channels from the source to all nodes. Although Overcast makes no guarantees that the topologies created are optimal, our simulations show that they perform quite well. The exact method by which high-bandwidth distribution trees are created and maintained is described in Section 4.2.

3.4 Deployment

An important goal for Overcast is to be deployable on today's Internet infrastructure. This motivates not only the use of an overlay network, but many of its details. In particular, deployment must require little or no human intervention, costs per node should be minimized, and unmodified HTTP clients must be able to join multicast groups in the Overcast network.

To help ease the human costs of deployment, nodes in the Overcast network configure themselves in an adaptive distributed tree with a single root. No human intervention is required to build efficient distribution trees, and nodes can be a part of multiple distribution trees. Overcast's implementation on commodity PCs running Linux further eases deployment. Development is speeded by the familiar programming environment, and hardware costs are minimized by continually tracking the best price/performance ratio available in off-the-shelf hardware. The exact hardware configuration we have deployed has changed many times in the year or so that we have deployed Overcast nodes.

The final consumers of content from an Overcast network are HTTP clients. The Overcast protocols are carefully designed so that unmodified Web browsers can become members of a multicast group. In Overcast, a multicast group is represented as an HTTP URL: the hostname portion names the root of an Overcast network and the path represents a particular group on the network. All groups with the same root share a single distribution tree.

Using URLs as a namespace for Overcast groups has three advantages. First, URLs offer a hierarchical namespace, addressing the scarcity of multicast group names in traditional IP Multicast. Second, URLs and the means to access them are an existing standard. By delivering data over a simple HTTP connection, Overcast is able to bring multicasting to unmodified applications. Third, a URL's richer structure allows for simple expression of the increased power of Overcast over tradition multicast. For example, a group suffix of start=10s may be defined to mean "begin the content stream 10 seconds from the beginning."

3.5 Example Usage

We have used Overcast to build a content distribution application for high-quality video and live streams. The application is built out of a publishing station (called a studio) and nodes (called appliances). Appliances are installed at strategic locations in their network. The appliances boot, contact their studio, and self-organize into a distribution tree, as described below. No local administration is required.

The studio stores content and schedules it for delivery to the appliances. Typically, once the content is delivered, the publisher at the studio generates a web page announcing the availability of the content. When a user clicks on the URL for published content, Overcast redirects the request to a nearby appliance and the appliance serves the content. If the content is video, no special streaming software is needed. The user can watch the video over standard protocols and a standard MPEG player, which is supplied with most browsers.

An administrator at the studio can control the overlay network from a central point. She can view the status of the network (e.g., which appliances are up), collect statistics, control bandwidth consumption, etc.

Using this system, bulk data can be distributed efficiently, even if the network between the appliances and the studio consists of low-bandwidth or intermittent links. Given the relative prices of disk space and network bandwidth, this solution is far less expensive than upgrading all network links between the studio and every client.

4 Protocols

The previous section described the structure and properties of the Overcast overlay network. This section describes how it functions: the initialization of individual nodes, the construction of the distribution hierarchy, and the automatic maintenance of the network. In particular, we describe the "tree" protocol to build distribution trees and the "up/down" protocol to maintain the global state of the Overcast network efficiently. We close by describing how clients (web browsers) join a group and how reliable multicasting to clients is performed.

4.1 Initialization

When a node is first plugged in or moved to a new location it automatically initializes itself and contacts the appropriate Overcast root(s). The first step in the initialization process is to determine an IP address and gateway address that the node can use for general IP connectivity. If there is a local DHCP server then the node can obtain IP configuration directly data using the DHCP protocol. If DHCP is unavailable, a utility program can be used from a nearby workstation for manual configuration.

Once the node has an IP configuration it contacts a global, well-known registry, sending along its unique serial number. Based on a node's serial number, the registry provides a list of the Overcast networks the node should join, an optional permanent IP configuration, the network areas it should serve, and the access controls it should implement. If a node is intended to become part of a particular content distribution network, the configuration data returned will be highly specific. Otherwise, default values will be returned and the networks to which a node will join can be controlled using a web-based GUI.

4.2 The Tree Building Protocol

Self-organization of appliances into an efficient, robust distribution tree is the key to efficient operation in Overcast. Once a node initializes, it begins a process of self-organization with other nodes of the same Overcast network. The nodes cooperatively build an overlay network in the form of a distribution tree with the root node at its source. This section describes the tree-building protocol. As described earlier, the virtual links of the overlay network are the only paths on which data is exchanged. Therefore the choice of distribution tree can have a significant impact on the aggregate communication behavior of the overlay network. By carefully building a distribution tree, the network utilization of content distribution can be significantly reduced. Overcast stresses bandwidth over other conceivable metrics, such as latency, because of its expected applications. Overcast is not intended for interactive applications, therefore optimizing a path to shave small latencies at the expense of total throughput would be a mistake. On the other hand, Overcast's architecture as an overlay network allows this decision to be revisited. For instance, it may be decided that trees should have a fixed maximum depth to limit buffering delays.

The goal of Overcast's tree algorithm is to maximize bandwidth to the root for all nodes. At a high level the algorithm proceeds by placing a new node as far away from the root as possible without sacrificing bandwidth to the root. This approach leads to "deep" distribution trees in which the nodes nonetheless observe no worse bandwidth than obtaining the content directly from the root. By choosing a parent that is nearby in the network, the distribution tree will form along the lines of the substrate network topology.

The tree protocol begins when a newly initialized node contacts the root of an Overcast group. The root thereby becomes the current node. Next, the new node begins a series of rounds in which it will attempt to locate itself further away from the root without sacrificing bandwidth back to the root. In each round the new node considers its bandwidth to current as well as the bandwidth to current through each of current's children. If the bandwidth through any of the children is about as high as the direct bandwidth to current, then one of these children becomes current and a new round commences. In the case of multiple suitable children, the child closest (in terms of network hops) to the searching node is chosen. If no child is suitable, the search for a parent ends with current.

To approximate the bandwidth that will be observed when moving data, the tree protocol measures the download time of 10 Kbytes. This measurement includes all the costs of serving actual content. We have observed that this approach to measuring bandwidth gives us better results than approaches based on low-level bandwidth measurements such as using ping. On the other hand, we recognize that a 10 Kbyte message is too short to accurately reflect the bandwidth of "long fat pipes". We plan to move to a technique that uses progressively larger measurements until a steady state is observed.

When the measured bandwidths to two nodes are within 10% of each other, we consider the nodes equally good and select the node that is closest, as reported by traceroute. This avoids frequent topology changes between two nearly equal paths, as well as decreasing the total number of network links used by the system.

A node periodically reevaluates its position in the tree by measuring the bandwidth to its current siblings (an up-to-date list is obtained from the parent), parent, and grandparent. Just as in the initial building phase, a node will relocate below its siblings if that does not decrease its bandwidth back to the root. The node checks bandwidth directly to the grandparent as a way of testing its previous decision to locate under its current parent. If necessary the node moves back up in the hierarchy to become a sibling of its parent. As a result, nodes constantly reevaluate their position in the tree and an Overcast network is inherently tolerant of nonroot node failures. If a node goes offline for some reason, any nodes that were below it in the tree will reconnect themselves to the rest of the routing hierarchy. When a node detects that its parent is unreachable, it will simply relocate beneath its grandparent. If its grandparent is also unreachable the node will continue to move up its ancestry until it finds a live node. The ancestor list also allows cycles to be avoided as nodes asynchronously choose new parents. A node simply refuses to become the parent of a node it believes to be it's own ancestor. A node that chooses such a node will forced to rechoose.

While there is extensive literature on faster fail-over algorithms, we have not yet found a need to optimize beyond the strategy outlined above. It is important to remember that the nodes participating in this protocol are dedicated machines that are less prone to failure than desktop computers. If this becomes an issue, we have considered extending the tree building algorithm to maintain backup parents (excluding a node's own ancestry from consideration) or an entire backup tree.

By periodically remeasuring network performance, the overlay network can adapt to network conditions that manifest themselves at time scales larger than the frequency at which the distribution tree reorganizes. For example, a tree that is optimized for bandwidth efficient content delivery during the day may be significantly suboptimal during the overnight hours (when network congestion is typically lower). The ability of the tree protocol to automatically adapt to these kinds of changing network conditions provides an important advantage over simpler, statically configured content distribution schemes.

4.3 The Up/Down Protocol

To allow web clients to join a group quickly, the Overcast network must track the status of the Overcast nodes. It may also be important to report statistical information back to the root, so that content providers might learn, for instance, how often certain content is being viewed. This section describes a protocol for efficient exchange of information in a tree of network nodes to provide the root of the tree with information from nodes throughout the network. For our needs, this protocol must scale sublinearly in terms of network usage at the root, but may scale linearly in terms of space (all with respect to the number of Overcast nodes). This is a simple result of the relative requirements of a client for these two resources and the cost of those resources. Overcast might store (conservatively) a few hundred bytes about each Overcast node, but even in a group of millions of nodes, total RAM cost for the root would be under $1,000. We call this protocol the "up/down" protocol because our current system uses it mainly to keep track of what nodes are up and what nodes are down. However, arbitrary information in either of two large classes may be propagated to the root. In particular, if the information either changes slowly (e.g., up/down status of nodes), or the information can be combined efficiently from multiple children into a single description (e.g., group membership counts), it can be propagated to the root. Rapidly changing information that can not be aggregated during propagation would overwhelm the root's bandwidth capacity.

Each node in the network, including the root node, maintains a table of information about all nodes lower than itself in the hierarchy and a log of all changes to the table. Therefore the root node's table contains up-to-date information for all nodes in the hierarchy. The table is stored on disk and cached in the memory of a node. The basis of the protocol is that each node periodically checks in with the node directly above it in the tree. If a child fails to contact its parent within a preset interval, the parent will assume the child and all its descendants have "died". That is, either the node has failed, an intervening link has failed, or the child has simply changed parents. In any case, the parent node marks the child and its descendants "dead" in its table. Parents never initiate contact with descendants. This is a byproduct of a design that is intended to cross rewalls easily. All node failures must be detected by a failure to check in, rather than active probing.

During these periodic check-ins, a node reports new information that it has observed or been informed of since it last checked in. This includes:

"Death certificates"—Children that have missed their expected report time.

"Birth certificates"—Nodes that have become children of the reporting node.

Changes to the reporting node's "extra information."

Certificates or changes that have been propagated to the node from its own children since its last checkin.

This simple protocol exhibits a race condition when a node chooses a new parent. The moving node's former parent propagates a death certificate up the hierarchy, while at nearly the same time the new parent begins propagating a birth certificate up the tree. If the birth certificate arrives at the root first, when the death certificate arrives the root will believe that the node has failed. This inaccuracy will remain indefinitely since a new birth certificate will only be sent in response to a change in the hierarchy that may not occur for an arbitrary period of time.

To alleviate this problem, a node maintains a sequence number indicating of how many times it has changed parents. All changes involving a node are tagged with that number. A node ignores changes that are reported to it about a node if it has already seen a change with a higher sequence number. For instance, a node may have changed parents 17 times.

When it changes again, its former parent will propagate a death certificate annotated with 17. However, its new parent will propagate a birth certificate annotated with 18. If the birth certificate arrives first, the death certificate will be ignored since it is older. An important optimization to the up/down protocol avoids large sets of birth certificates from arriving at the root in response to a node with many descendants choosing a new parent. Normally, when a node moves to a new parent, a birth certificate must be sent out for each of its descendants to its new parent. This maintains the invariant that a node knows the parent of all its descendants. Keep in mind that a birth certificate is not only a record that a node exists, but that it has a certain parent.

Although this large set of updates is required, it is usually unnecessary for these updates to continue far up the hierarchy. For example, when a node relocates beneath a sibling, the sibling must learn about all of the node's descendants, but when the sibling, in turn, passes these certificates to the original parent, the original parent notices that they do not represent a change and quashes the certificate from further propagation.

Using the up/down protocol, the root of the hierarchy will receive timely updates about changes to the network. The freshness of the information can be tuned by varying the length of time between check-ins. Shorter periods between updates guarantee that information will make its way to the root more quickly. Regardless of the update frequency, bandwidth requirements at the root will be proportional to the number of changes in the hierarchy rather than the size of the hierarchy itself.

4.4 Replicating the Root

In Overcast, there appears to be the potential for significant scalability and reliability problems at the root. The up/down protocol works to alleviate the scalability difficulties in maintaining global state about the distribution tree, but the root is still responsible for handling all join requests from all HTTP clients. The root handles such requests by redirection, which is far less resource intensive than actually delivering the requested content. Nonetheless, the possibility of overload remains for particularly popular groups. The root is also a single point of failure.

To address this, overcast uses a standard technique used by many popular websites. The DNS name of the root resolves to any number of replicated roots in round-robin fashion. The database used to perform redirections is replicated to all such roots. In addition, IP address takeover may be used for immediate failover, since DNS caching may cause clients to continue to contact a failed replica. This simple, standard technique works well for this purpose because handling joins from HTTP clients is a read-only operation that lends well to distribution over numerous replicas.

There remains, however, a single point of failure for the up/down protocol. The functionality of the root in the up/down protocol cannot be distributed so easily because its purpose is to maintain changing state. However the up/down protocol has the useful property that all nodes maintain state for nodes below them in the distribution tree. Therefore, a convenient technique to address fault tolerance is to specially construct the top of the hierarchy.

Figure 9:
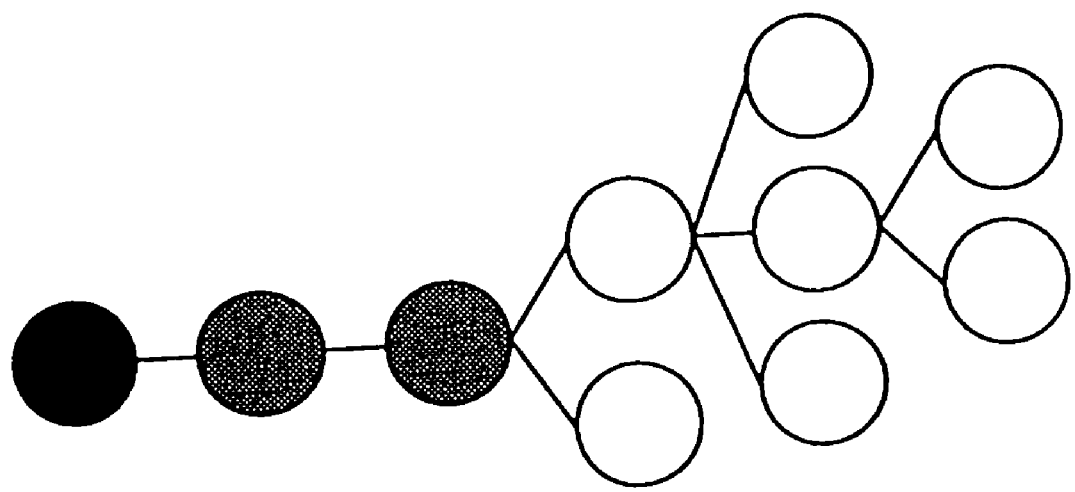
FIG. 9 illustrates a specially configured distribution topology that allows either of the grey nodes to quickly stand in as the root (black) node. All filled nodes have complete status information about the unfilled nodes.

Starting with the root, some number of nodes are configured linearly, that is, each has only one child. In this way all other overcast nodes lie below these top nodes. FIG. 9 shows a distribution tree in which the top three nodes are arranged linearly. Each of these nodes has enough information to act as the root of the up/down protocol in case of a failure. This technique has the drawback of increasing the latency of content distribution unless special-case code skips the extra roots during distribution. If latency were important to Overcast this would be an important, but simple, optimization.

"Linear roots" work well with the need for replication to address scalability, as mentioned above. The set of linear nodes has all the information needed to perform Overcast joins, therefore these nodes are perfect candidates to be used in the DNS round-robin approach to scalability. By choosing these nodes, no further replication is necessary.

4.5 Joining a Multicast Group

To join a multicast group, a Web client issues an HTTP GET request with the URL for a group. The hostname of the URL names the root node(s). The root uses the pathname of the URL, the location of the client, and its database of the current status of the Overcast nodes to decide where to connect the client to the multicast tree. Because status information is constantly propagated to the root, a decision may be made quickly without further network traffic, enabling fast joins.

Joining a group consists of selecting the best server and redirecting the client to that server. The details of the server selection algorithm are beyond the scope of this paper as considerable previous work exists in this area. Furthermore, Overcast's particular choices are constrained considerably by a desire to avoid changes at the client. Without such a constraint simpler choices could have been made, such as allowing clients to participate directly in the Overcast tree building protocol.

Although we do not discuss server selection here, a number of Overcast's details exist to support this important functionality, however it may actually be implemented. A centralized root performing redirections is convenient for an approach involving large tables containing collected Internet topology data. The up/down algorithm allows for redirections to nodes that are known to be functioning.

4.6 Multicasting with Overcast

We refer to reliable multicasting on an overcast network as "overcasting". Overcasting proceeds along the distribution tree built by the tree protocol. Data is moved between parent and child using TCP streams. If a node has four children, four separate connections are used. The content may be pipelined through several generations in the tree. A large file or a long-running live stream may be in transit over tens of different TCP streams at a single moment, in several layers of the distribution hierarchy.

If a failure occurs during an overcast, the distribution tree will rebuild itself as described above. After rebuilding the tree, the overcast resumes for on-demand distributions where it left off. In order to do so, each node keeps a log of the data it has received so far. After recovery, a node inspects the log and restarts all overcasts in progress.

Live content on the Internet today is typically buffered before playback. This compensates for momentary glitches in network throughput. Overcast can take advantage of this buffering to mask the failure of a node being used to Overcast data. As long as the failure occurs in a node that is not at the edge of the Overcast network, an HTTP client need not ever become aware that the path of data from the root has been changed in the face of failure.

Evaluation

In this section, the protocols presented above are evaluated by simulation. Although we have deployed Overcast in the real world, we have not yet deployed on a sufficiently large network to run the experiments we have simulated.

To evaluate the protocols, an overlay network is simulated with increasing numbers of overcast nodes while keeping the total number of network nodes constant. Overcast should build better trees as more nodes are deployed, but protocol overhead may grow.

We use the Georgia Tech Internet work Topology Models (GT-ITM) to generate the network topologies used in our simulations. We use the "transit-stub" model to obtain graphs that more closely resemble the Internet than a pure random construction. GT-ITM generates a transit-stub graph in stages, first a number of random backbones (transit domains), then the random structure of each back-bone, then random "stub" graphs are attached to each node in the backbones.

We use this model to construct five different 600 node graphs. Each graph is made up of three transit domains. These domains are guaranteed to be connected. Each transit domain consists of an average of eight stub networks. The stub networks contain edges amongst themselves with a probability of 0.5. Each stub network consists of an average of 25 nodes, in which nodes are once again connected with a probability of 0.5. These parameters are from the sample graphs in the GT-ITM distribution; we are unaware of any published work that describes parameters that might better model common Internet topologies.

We extended the graphs generated by GT-ITM with bandwidth information. Links internal to the transit domains were assigned a bandwidth of 45 Mbits's, edges connecting stub networks to the transit domains were assigned 1.5 Mbits's, finally, in the local stub domain, edges were assigned 100 Mbit's. These re commonly used network technology: T3s, T1s, and Fast Ethernet. All measurements are averages over the five generated topologies.

Empirical measurements from actual Overcast nodes show that a single Overcast node can easily support twenty clients watching MPEG-1 videos, though the exact number is greatly dependent on the bandwidth requirements of the content. Thus with a network of 600 overcast nodes, we are simulating multicast groups of perhaps 12,000 members.

5.1 Tree Protocol

The efficiency of Overcast depends on the positioning of Overcast nodes. In our first experiments, we compare two different approaches to choosing positions. The first approach, labelled "Backbone", preferentially chooses transit nodes to contain Overcast nodes. Once all transit nodes are Overcast nodes, additional nodes are chosen at random. This approach corresponds to a scenario in which the owner of the Overcast nodes places them strategically in the network. In the second, labelled "Random", we select all Overcast nodes at random. This approach corresponds to a scenario in which the owner of Overcast nodes does not pay attention to where the nodes are placed.

Figure 10:
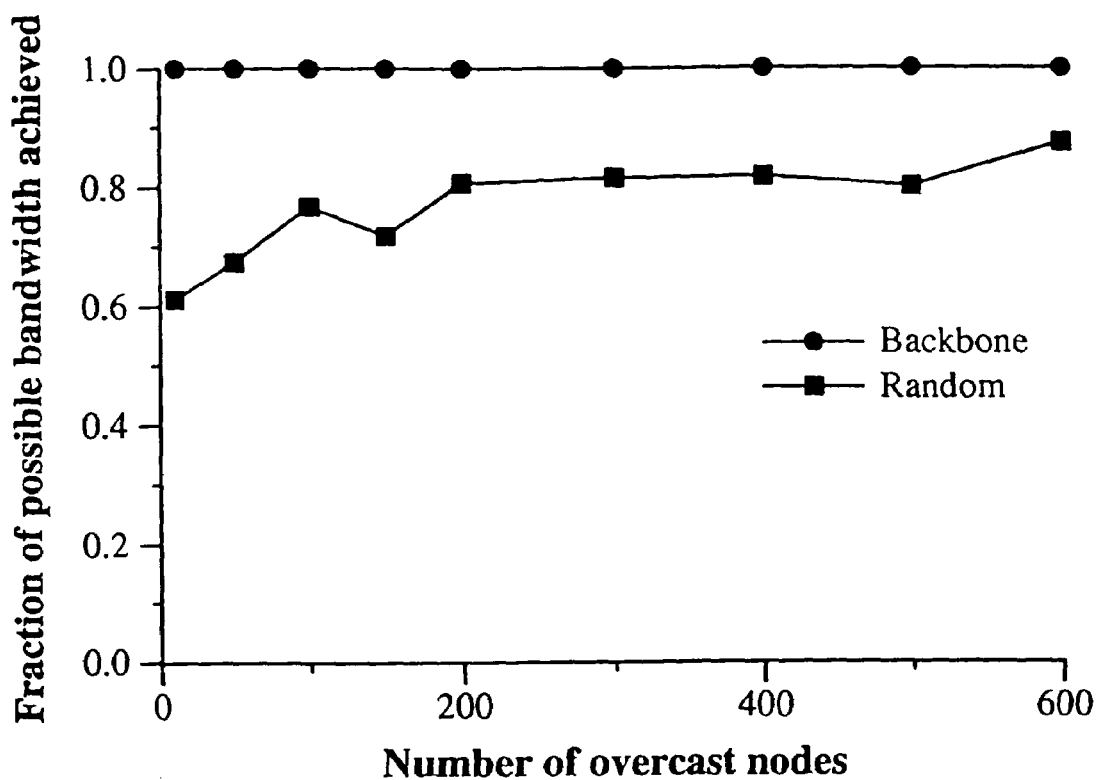
FIG. 10 illustrates a fraction of potential bandwidth provided by Overcast.

The goal of Overcast's tree-building protocol is to optimize the bottleneck bandwidth available back to the root for all nodes. The goal is to provide each node with the same bandwidth to the root that the node would have in an idle network. FIG. 10 compares the sum of all nodes' bandwidths back to the root in Overcast networks of various sizes to the sum of all nodes' bandwidths back to the root in an optimal distribution tree using router-based software. This indicates how well Overcast performs compared to IP Multicast.

The main observation is that, as expected, the backbone strategy for placing Overcast nodes is more effective than the random strategy, but the results of random placement are encouraging nonetheless. Even a small number of deployed Overcast nodes, positioned at random, provide approximately 70%–80% of the total possible bandwidth.

It is extremely encouraging that, when using the backbone approach, no node receives less bandwidth under Overcast than it would receive from IP Multicast. However some enthusiasm must be withheld, because a simulation artifact has been left in these numbers to illustrate a point.

Notice that the backbone approach and the random approach differ in effectiveness even when all 600 nodes of the network are Overcast nodes. In this case the same nodes are participating in the protocol, but better trees are built using the backbone approach. This illustrates that the trees created by the tree-building protocol are not unique. The backbone approach fares better by this metric because in our simulations backbone nodes were turned on first. This allowed backbone nodes to preferentially form the "top" of the tree. This indicates that in future work it may be beneficial to extend the tree-building protocol to accept hints that mark certain nodes as "backbone" nodes. These nodes would preferentially form the core of the distribution tree. Overcast appears to perform quite well for its intended goal of optimizing available bandwidth, but it is reasonable to wonder what costs are associated with this performance.

Figure 11:
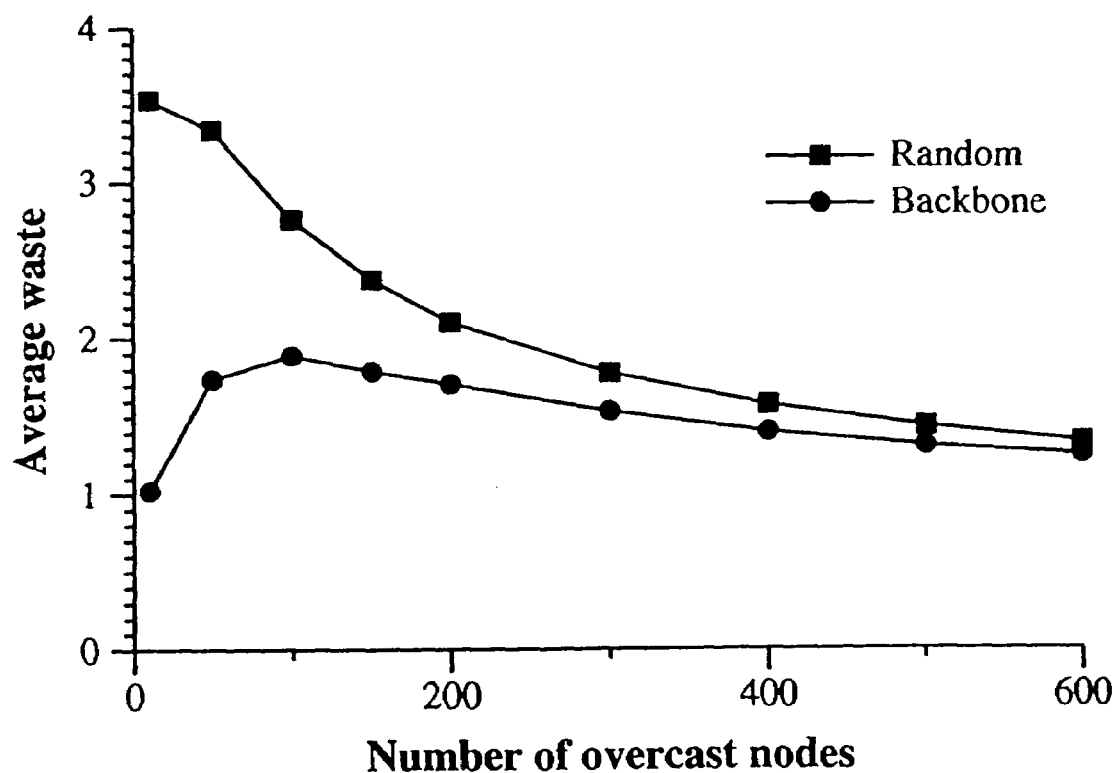
FIG. 11 illustrates a ratio of the number of times a packet must "hit the wire" to be propagated through an Overcast network to a lower bound estimate of the same measure for IP Multicast.

To explore this question we measure the network load imposed by Overcast. We define network load to be the number of times that a particular piece of data must traverse a network link to reach all Overcast nodes. In order to compare to IP Multicast FIG. 11 plots the ratio of the network load imposed by Overcast to a lower bound estimate of IP Multicast's network load. For a given set of nodes, we assume that IP Multicast would require exactly one less link than the number of nodes. This assumes that all nodes are one hop away from another node, which is unlikely to be true in sparse topologies, but provides a lower bound for comparison.

FIG. 11 shows that for Overcast networks with greater than 200 nodes Overcast imposes somewhat less than twice as much network load as IP Multicast. In return for this extra load Overcast offers reliable delivery, immediate deployment, and future flexibility. For networks with few Overcast nodes, Overcast appears to impose a considerably higher network load than IP Multicast. This is a result of our optimistic lower bound on IP Multicast's network load, which assumes that 50 randomly placed nodes in a 600 node network can be spanned by 49 links.

Another metric to measure the effectiveness of an application-level multicast technique is stress, proposed in. Stress indicates the number of times that the same data traverses a particular physical link. By this metric, Overcast performs quite well with average stresses of between 1 and 1.2. We do not present detailed analysis of Overcast's performance by this metric, however, because we believe that network load is more telling for Overcast. That is, Overcast has quite low scores for average stress, but that metric does not describe how often a longer route was taken when a shorter route was available.

Another question is how fast the tree protocol converges to a stable distribution tree, assuming a stable underlying network. This is dependent on three parameters. The round period controls how long a node that has not yet determined a stable position in the hierarchy will wait before evaluating a new set of potential parents. The reevaluation period determines how long a node will wait before reevaluating its position in the hierarchy once it has obtained a stable position. Finally the lease period determines how long a parent will wait to hear from a child before reporting the child's death.

Figure 12:
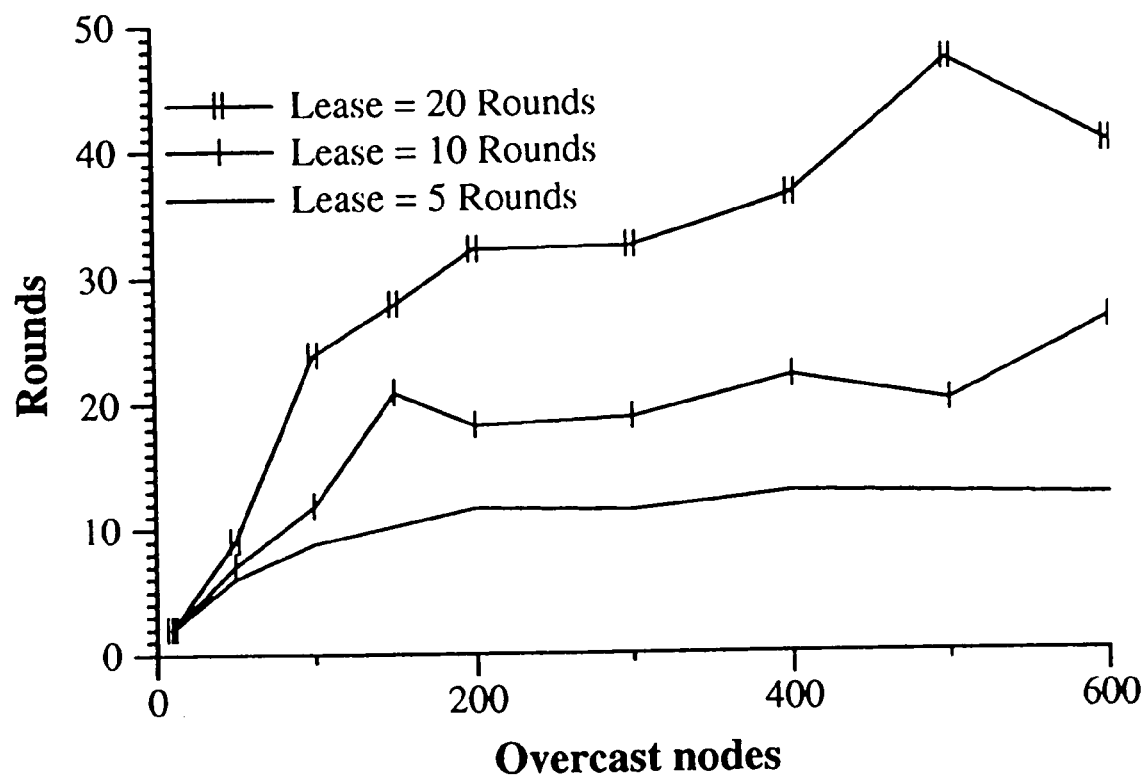
FIG. 12 illustrates the number of rounds to reach a stable distribution tree as a function of the number of overcast nodes and the length of the lease period.

For convenience, we measure all convergence times in terms of the fundamental unit, the round time. We also set the reevaluation period and lease period to the same value. FIG. 12 shows how long Overcast requires to converge if an entire Overcast network is simultaneously activated. To demonstrate the effect of a changing reevaluation and lease period, we plot for the "standard" lease time—10 rounds, as well as longer and shorter periods. Lease periods shorter than five rounds are impractical because children actually renew their leases a small random number of rounds (between one and three) before their lease expires to avoid being thought dead. We expect that a round period on the order of 1–2 seconds will be practical for most applications.

We next measure convergence times for an existing Overcast network in which overcast nodes are added or fail. We simulate overcast networks of various sizes until they quiesce, add and remove Overcast nodes, and then simulate the network until it quiesces once again.

We measure the time, in rounds, for the network to quiesce after the changes. We measure for various numbers of additions and removals allowing us to assess the dependence of convergence on how many nodes have changed state. We measure only the backbone approach.

Figure 13:
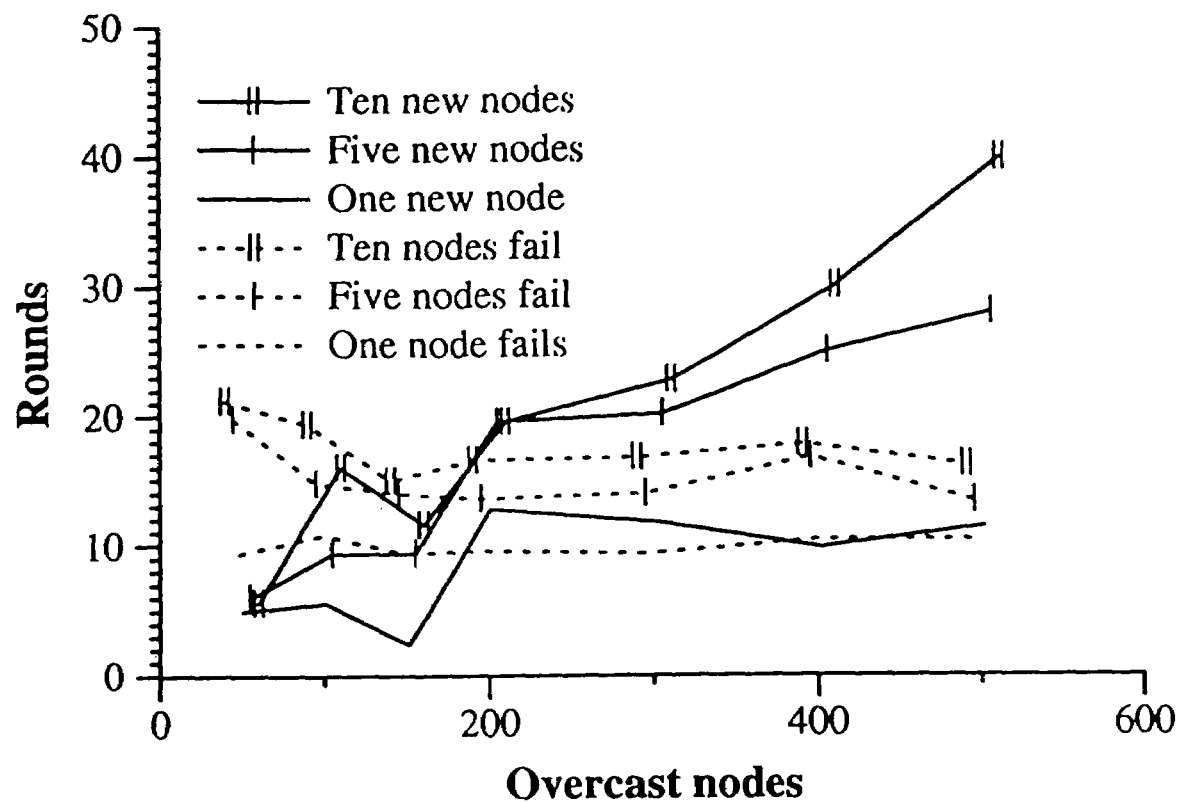
FIG. 13 illustrates the number of rounds to recover a stable distribution tree as a function of the number of nodes that change state and the number of nodes in the network.

FIG. 13 plots convergence times (using a 10 round lease time) against the number of overcast nodes in the network. The convergence time for node failures is quite modest. In all simulations the Overcast network reconverged after less than three lease times. Furthermore, the reconvergence time scaled well against both the number of nodes failing and the total number of nodes in the overcast network. In neither case was the convergence time even linearly affected.

For node additions, convergence times do appear more closely linked to the size of the Overcast network. This makes intuitive sense because new nodes are navigating the network to determine their best location. Even so, in all simulations fewer than five lease times are required. It is important to note that an Overcast network continues to function even while stabilizing. Performance may be somewhat impacted by increased measurement traffic and by TCP setup and tear down overhead as parents change, but such disruptions are localized.

5.2 Up/Down Protocol

The goal of the up/down algorithm is to minimize the bandwidth required at the root node while maintaining timely status information for the entire network. Factors that affect the amount of bandwidth used include the size of the overcast network and the rate of topology changes. Topology changes occur when the properties of the underlying network change, nodes fail, or nodes are added. Therefore the up/down algorithm is evaluated by simulating overcast networks of various sizes in which various numbers of failures and additions occur.

To assess the up/down protocol's ability to provide timely status updates to the root without undue overhead we keep track of the number of certificates (for both "birth" and "death") that reach the root during the previous convergence tests. This is indicative of the bandwidth required at the root node to support an overcast network of the given size and is dependent on the amount of topology change induced by the additions and deletions.

Figure 14:
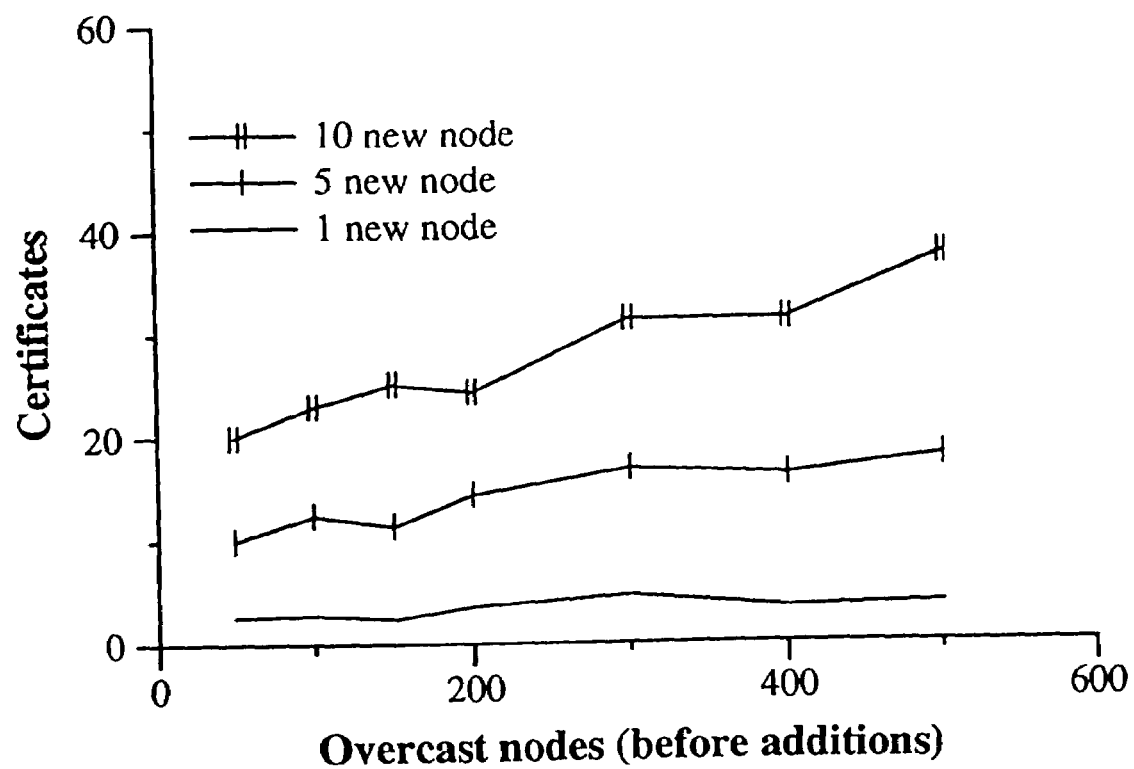
FIG. 14 illustrates certificates received at the root in response to node additions.

FIG. 14 graphs the number of certificates received by the root node in response to new nodes being brought up in the overcast network. Remember, the root may receive multiple certificates per node addition because the addition is likely to cause some topology reconfiguration. Each time a node picks a new parent that parent propagates a birth certificate. These results indicate that the number of certificates is quite modest: certainly no more than four certificates per node addition, usually approximately three. What is more important is that the number of certificates scales more closely to the number of new nodes than the size of the overcast network. This gives evidence that overcast can scale to large networks.

Figure 15:
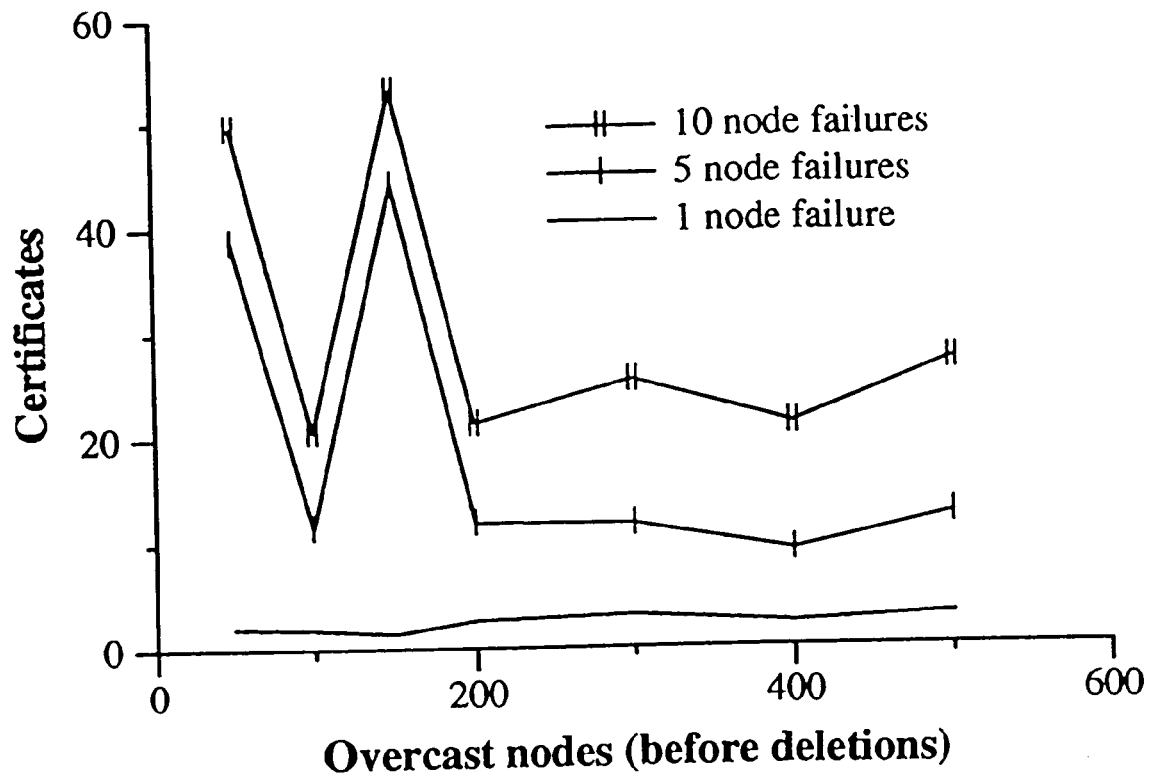
FIG. 15 illustrates certificates received at the root in response to node deletions.

Similarly, Overcast requires few certificates to react to node failures. FIG. 15 shows that in the common case, no more than four certificates are required per node failure. Again, because the number of certificates is proportional to the number of failures rather than the size of the network, Overcast appears to offer the ability to scale to large networks.

On the other hand, FIG. 15 shows that there are some cases that fall far outside the norm. The large spikes at 50 and 150 node networks with 5 and 10 failures occurred because of failures that happened to occur near the root. When a node with a substantial number of children chooses a new parent it must convey it's entire set of descendants to its new parent. That parent then propagates the entire set. However, when the information reaches a node that already knows the relationships in question, the update is quashed. In these cases, because the reconfigurations occurred high in the tree there was no chance to quash the updates before they reached the root. In larger networks such failures are less likely.

6 Conclusions

We have described a simple tree-building protocol that yields bandwidth-efficient distribution trees for single-source multicast and our up/down protocol for providing timely status updates to the root of the distribution tree in scalable manner. Overcast implements these protocols in an overlay network over the existing Internet. The protocols allow Overcast networks to dynamically adapt to changes (such as congestion and failures) in the underlying network infrastructure and support large, reliable single-source multicast groups. Geographically-dispersed businesses have deployed Overcast nodes in small-scale Overcast networks for distribution of high-quality, on-demand video to unmodified desktops.

Simulation studies with topologies created with the Georgia Tech Internet work Topology Models show that Overcast networks work well on large-scale networks, supporting multicast groups of up to 12,000 members. Given these results and the low cost for Overcast nodes, we believe that putting computation and storage in the network fabric is a promising approach for adding new services to the Internet incrementally.

What is claimed is:

1. A method for managing a network of nodes, the steps comprising:

requesting an initial set of network metrics for an initial subset of nodes in the network of nodes based on a connecting node attempting to establish a relationship with a target node of the initial subset, each network metric of the initial set associated with a respective node from the initial subset and measuring a performance aspect of the respective node relative to the network;

receiving the initial set of the network metrics for the initial subset of nodes;

establishing the relationship between the connecting node and the target node of the initial subset based on a comparison of the network metrics in the initial set; and prior to the step of requesting the initial set of network metrics, selecting a network metric from at least one of a bottleneck bandwidth metric, a latency metric, and a hop count metric; and further comprising the steps of:

(i) choosing a revised subset of nodes based on the target node;

(ii) requesting a revised set of the network metrics based on the revised subset;

(iii) receiving the revised set of the network metrics based on the revised subset;

(iv) establishing a selected relationship between the connecting node and a selected target node of the revised subset based on a comparison of the network metrics in the revised set of network metrics and setting the selected target node to be the target node;

(v) repeating steps (i) through (iv) until determining that the selected relationship to the target node is a preferred relationship for the connecting node to the network.

2. The method of claim 1, wherein the step of receiving the initial set of network metrics comprises measuring a set of interactions over the network between the connecting node and the target node and between the connecting node and each node from the initial subset of the nodes.

3. The method of claim 1, wherein the step of receiving the initial set of network metrics comprises measuring a set of bottleneck bandwidth metrics between each node of the initial subset and a root node of the network of nodes.

4. The method of claim 1, wherein the connecting node does not have a previous relationship to the network prior to the step of requesting the initial set of network metrics, and the initial subset of nodes comprises a root node of the network of nodes.

5. A method for managing a network of nodes, the steps comprising:

requesting an initial set of network metrics for an initial subset of nodes in the network of nodes based on a connecting node attempting to establish a relationship with a target node of the initial subset, each network metric of the initial set associated with a respective node from the initial subset and measuring a performance aspect of the respective node relative to the network;

receiving the initial set of the network metrics for the initial subset of nodes;

establishing the relationship between the connecting node and the target node of the initial subset based on a comparison of the network metrics in the initial set; and prior to the step of requesting the initial set of network metrics, selecting a network metric from at least one of a bottleneck bandwidth metric, a latency metric, and a hop count metric, wherein:
the connecting node is a reconnecting node having an existing association with the network and attempting to replace the existing association with a modified association with the network represented by the relationship with the target node; and
further comprising the steps of:
selecting a plurality of initial subsets of nodes at periodic intervals; and
performing the steps of requesting, receiving, and establishing at each periodic interval based on each initial subset of nodes of the plurality of initial subsets of nodes.

6. The method of claim 5, wherein the step of selecting the plurality of initial subsets of nodes is based on a lineage selection procedure that selects nodes for each initial subset based on a lineage group of nodes associated with the connecting node in the network.

7. The method of claim 5, wherein the step of selecting the plurality of initial subsets of nodes is based on a remote selection procedure that selects nodes for each initial subset based on selecting at least one node for each initial subset exclusive of a lineage group of nodes associated with the connecting node.

8. A computer system for managing a network of nodes, the computer system comprising:
a memory;
a network interface in communication with the memory; and
a processor in communication with the memory and the network interface, wherein the memory is encoded with logic instructions for a network manager application that, when performed on the processor, cause the processor to form a network manager that manages the nodes in the network by performing the operations of:
requesting an initial set of network metrics for an initial subset of nodes in the network of nodes based on a connecting node attempting to establish a relationship with a target node of the initial subset, each network metric of the initial set associated with a respective node from the initial subset and measuring a performance aspect of the respective node relative to the network;
receiving the initial set of the network metrics for the initial subset of nodes; and
establishing the relationship between the connecting node and the target node of the initial subset based on a comparison of the network metrics in the initial set; and
wherein the logic instructions for the network manager application comprise further logic instructions, that, when performed on the processor, cause the network manager to perform the operation, prior to requesting the initial set of network metrics, of selecting the network metric from one of a bottleneck bandwidth metric, a latency metric, and a hop count metric; and
wherein the logic instructions for the network manager application comprise further logic instructions, that, when performed on the processor, cause the network manager to perform the operations of:
(i) choosing a revised subset of nodes based on the target node;
(ii) requesting a revised set of the network metrics based on the revised subset;
(iii) receiving the revised set of the network metrics based on the revised subset;
(iv) establishing a selected relationship between the connecting node and a selected target node of the revised subset based on a comparison of the network metrics in the revised set of network metrics and setting the selected target node to be the target node;
(v) repeating steps (i) through (iv) until determining that the selected relationship to the target node is a preferred relationship for the connecting node to the network.

9. The computer system of claim 8, wherein the logic instructions for the network manager application comprise further logic instructions, that, when performed on the processor, cause the network manager to perform the operation of measuring a set of interactions over the network between the connecting node and the target node and between the connecting node and each node from the initial subset of the nodes.

10. The computer system of claim 8, wherein the logic instructions for the network manager application comprise further logic instructions, that, when performed on the processor, cause the network manager to perform the operation of measuring a set of bottleneck bandwidth metrics between each node of the initial subset and a root node of the network of nodes.

11. The computer system of claim 8, wherein the connecting node does not have a previous relationship to the network prior to the step of requesting the initial set of network metrics, and the initial subset of nodes comprises a root node of the network of nodes.

12. The computer system of claim 8, wherein the computer system is the connecting node.

13. A computer system for managing a network of nodes, the computer system comprising:
a memory;
a network interface in communication with the memory; and
a processor in communication with the memory and the network interface, wherein the memory is encoded with logic instructions for a network manager application that, when performed on the processor, cause the processor to form a network manager that manages the nodes in the network by performing the operations of:
requesting an initial set of network metrics for an initial subset of nodes in the network of nodes based on a connecting node attempting to establish a relationship with a target node of the initial subset, each network metric of the initial set associated with a respective node from the initial subset and measuring a performance aspect of the respective node relative to the network;
receiving the initial set of the network metrics for the initial subset of nodes; and
establishing the relationship between the connecting node and the target node of the initial subset based on a comparison of the network metrics in the initial set; and
wherein the logic instructions for the network manager application comprise further logic instructions, that, when performed on the processor, cause the network manager to perform the operation, prior to requesting the initial set of network metrics, of selecting the network metric from one of a bottleneck bandwidth metric, a latency metric, and a hop count metric, wherein:
the connecting node is a reconnecting node having an existing association with the network and attempting to replace the existing association with a modified association with the network represented by the relationship with the target node; and the logic instructions for the network manager application comprise further logic instructions, that, when performed on the processor, cause the network manager to perform the operations of:

selecting a plurality of initial subsets of nodes at periodic intervals; and performing the operations of requesting, receiving, and establishing at each periodic interval based on each initial subset of nodes of the plurality of initial subsets of nodes.

14. The computer system of claim 13, wherein the logic instructions for the network manager application comprise further logic instructions, that, when performed on the processor, cause the network manager to perform the operation of selecting the plurality of initial subsets of nodes based on a lineage selection procedure that selects nodes for each initial subset based on a lineage group of nodes associated with the connecting node in the network.

15. The computer system of claim 13, wherein the logic instructions for the network manager application comprise further logic instructions, that, when performed on the processor, cause the network manager to perform the operations of selecting the plurality of initial subsets of nodes based on a remote selection procedure that selects nodes for each initial subset based on selecting at least one node for each initial subset exclusive of a lineage group of nodes associated with the connecting node.

16. A method for managing an overlay network of nodes, the method comprising:

requesting an initial set of network metrics for an initial subset of nodes in the overlay network of nodes based on a new node attempting to establish a virtual link with a target node of the initial subset, each network metric of the initial set associated with a respective node from the initial subset and measuring bandwidth to a root node from each respective node;

receiving the initial set of the network metrics for the initial subset of nodes;

establishing the virtual link between the new node and the target node of the initial subset based on a comparison of the network metrics in the initial set;

choosing a revised subset of nodes based on the target node;

requesting a revised set of the network metrics based on the revised subset;

receiving the revised set of the network metrics based on the revised subset; and establishing a selected relationship between the connecting node and a selected target node of the revised subset based on a comparison of the network metrics in the revised set of network metrics and setting the selected target node to be the target node;

wherein choosing the revised subset, requesting the revised set, receiving the revised set and establishing the selected relationship are adapted to be performed until determining that the selected relationship to the target node is a preferred relationship for the connecting node to the network.

* * * * *